(12) United States Patent
Jing et al.

(10) Patent No.: US 9,116,921 B2
(45) Date of Patent: *Aug. 25, 2015

(54) GROUPING OF IMAGE SEARCH RESULTS

(71) Applicant: Google Inc., Mountain View, CA (US)

(72) Inventors: Yushi Jing, Mountain View, CA (US); Henry Allan Rowley, Sunnyvale, CA (US); Aparna Chennapragada, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/492,515

(22) Filed: Sep. 22, 2014

(65) Prior Publication Data
US 2015/0169635 A1 Jun. 18, 2015

Related U.S. Application Data

(63) Continuation of application No. 13/617,976, filed on Sep. 14, 2012, now Pat. No. 8,843,478, which is a continuation of application No. 12/876,077, filed on Sep. 3, 2010, now Pat. No. 8,352,465.

(60) Provisional application No. 61/239,723, filed on Sep. 3, 2009, provisional application No. 61/261,719, filed on Nov. 16, 2009.

(51) Int. Cl.
*G06F 17/30* (2006.01)
(52) U.S. Cl.
CPC .... *G06F 17/30247* (2013.01); *G06F 17/30554* (2013.01); *G06F 17/30598* (2013.01)
(58) Field of Classification Search
CPC .............. G06F 17/30247; G06F 17/30598; G06F 17/30277; G06F 17/30244
USPC .......... 707/723, 737, 748, 778, 829, 915, 956, 707/749, E17.046
See application file for complete search history.

(56) References Cited

U.S. PATENT DOCUMENTS

| | | |
|---|---|---|
| 5,893,095 A | 4/1999 | Jain |
| 5,915,250 A | 6/1999 | Jain |
| 6,285,999 B1 | 9/2001 | Page |

(Continued)

OTHER PUBLICATIONS

Li et al., "Statistical correlatoin analysis in image retrieval," The Journal of the Pattern Recognition Society, Pattern Recognition 35, 2002, pp. 2687-2693.

(Continued)

*Primary Examiner* — Phong Nguyen
(74) *Attorney, Agent, or Firm* — Fish & Richardson P.C.

(57) ABSTRACT

This specification relates to presenting image search results. In general, one aspect of the subject matter described in this specification can be embodied in methods that include the actions of receiving an image query, the image query being a query for image search results; receiving ranked image search results responsive to the image query, the image search results each including an identification of a corresponding image resource; generating a similarity matrix for images identified by the image search results; generating a hierarchical grouping of the images using the similarity matrix; identifying a canonical image for each group in the hierarchical grouping using a ranking measure; and presenting a visual representation of the image search results based on the hierarchical grouping and the identified canonical images.

20 Claims, 20 Drawing Sheets

(56) References Cited

U.S. PATENT DOCUMENTS

| | | | |
|---|---|---|---|
| 6,476,831 B1 | 11/2002 | Wirth et al. | |
| 6,847,733 B2* | 1/2005 | Savakis et al. | 382/225 |
| 7,035,467 B2 | 4/2006 | Nicponski | |
| 7,286,724 B2* | 10/2007 | Seol et al. | 382/305 |
| 7,394,947 B2 | 7/2008 | Li et al. | |
| 7,672,976 B2* | 3/2010 | Tobin et al. | 707/999.107 |
| 7,801,907 B2* | 9/2010 | Fischer et al. | 707/758 |
| 7,904,455 B2* | 3/2011 | Chiu et al. | 707/737 |
| 7,941,442 B2* | 5/2011 | Li et al. | 707/780 |
| 7,961,986 B1 | 6/2011 | Jing | |
| 8,090,222 B1 | 1/2012 | Baluja | |
| 8,209,330 B1 | 6/2012 | Covell | |
| 8,326,823 B2 | 12/2012 | Grandhi et al. | |
| 8,566,331 B1 | 10/2013 | Covell | |
| 2001/0033693 A1* | 10/2001 | Seol et al. | 382/219 |
| 2003/0048950 A1* | 3/2003 | Savakis et al. | 382/225 |
| 2003/0059107 A1* | 3/2003 | Sun et al. | 382/165 |
| 2004/0024758 A1 | 2/2004 | Iwasaki | |
| 2004/0056861 A1 | 3/2004 | Huber et al. | |
| 2004/0155888 A1 | 8/2004 | Padgitt et al. | |
| 2005/0004897 A1* | 1/2005 | Lipson et al. | 707/3 |
| 2005/0055344 A1 | 3/2005 | Liu | |
| 2005/0094901 A1* | 5/2005 | Seol et al. | 382/305 |
| 2005/0142529 A1 | 6/2005 | Andreyev | |
| 2005/0162523 A1* | 7/2005 | Darrell et al. | 348/211.2 |
| 2006/0071942 A1 | 4/2006 | Ubillos et al. | |
| 2006/0165277 A1 | 7/2006 | Shan | |
| 2006/0204142 A1* | 9/2006 | West et al. | 382/305 |
| 2006/0224993 A1 | 10/2006 | Wong et al. | |
| 2007/0036371 A1 | 2/2007 | Buil | |
| 2007/0098266 A1* | 5/2007 | Chiu et al. | 382/224 |
| 2007/0237426 A1* | 10/2007 | Xie et al. | 382/305 |
| 2007/0288462 A1* | 12/2007 | Fischer et al. | 707/7 |
| 2009/0150376 A1 | 6/2009 | O Callaghan | |
| 2010/0114933 A1 | 5/2010 | Murdock et al. | |
| 2012/0110453 A1 | 5/2012 | Ma et al. | |

OTHER PUBLICATIONS

Tombros et al., "Query-Sensitive Similarity Measures for Information Retrieval," Jan. 15, 2004, Knowledge and Information Systems, Springer-Verlag London Ltd.
Bederson, B.B., "PhotoMesa: A Zoomable Image Browser Using Quantum Treemaps and Bubblemaps," Nov. 11-14, 2001, Proceedings of the 14th Annual ACM Symposium on User Interface Software and Technology, pp. 71-80.
Berg, T.L., et al., "Automatic Ranking of Iconic Images," Tech. Rep., UCB/EECS-2007-13, EECS Department, University of California, Berkeley, Jan. 2007, 13 pages.
Brin, Sergey et al., "The Anatomy of a Large-Scale Hypertextual Web Search Engine," 71n International World Wide Conference, Brisbane, Australia, 1998, 20 pages.
Brown, M., et al., "Recognizing Panoramas," Proceedings of the Google ICCV, 2003. http://www.cs.ubc.ca/nest/lci/papers/2003/brown03.pdf, 8 pages.
Combs, Tammara, "Does Zooming Improve Image Browsing?," Feb. 1999, HCIL Technical Report No. 99-05, 10 pages.
Dalal, Navneet, et al., "Histograms of Oriented Gradients for Human Detection," Proceedings of the IEEE Conference on Computer Vision and Pattern Recognition, Jun. 2005, pp. 886-893. http://www.vis.uky.edu/~dnister/Teaching/CS684Fall2005/HOG.pdf.
Frey et al., "Clustering by Passing Messages Between Data Points," Science, Feb. 16, 2007, vol. 315, pp. 972-976.
Frome et al, "Learning Globally-Consistent Local Distance Functions for Shape-Based Image Retrieval and Classification," 2007 IEEE 11th International Conference on Computer Vision, Rio de Janeiro, Brazil, Oct. 14-21, 2007, pp. 1-8.
Gibson, David et al., "Inferring Web Communities from Link Topology," Proc. 91n ACM Conference on Hypertext and Hypermedia, 1998, 10 pages.
Gomi et al., "CAT: A Hierarchical Image Brower Using a Rectangle Packing Technique," Jul. 9-11, 2008, IEEE Computer Society, 12th International Conference Information Visualization, pp. 82-87.

Google, "About Google Image Swirl," Google Image Swirl Labs, downloaded from the internet at http://image-swirl.googleabs.com/html/en/help.html, on Aug. 17, 2011, 2 pages.
Google, "Chrome Web Store," Image Search Cooliris, downloaded from the internet at https://chrome.google.com/webstore/detail/jilgofbnhaihnfbokejhcndhoogagdmk, on Aug. 29, 2011, 2 pages.
Grangier et al., "A Discriminative Kernal-Based Model to Rank Images from Text Queries," IEEE Transactions of Pattern Analysis and Machine Intelligence, Aug. 2008, vol. 30, No. 8, pp. 1371-1384.
Grauman, Kristen et al., "The Pyramid Match Kernel: Discriminative Classification with Sets of Image Features," Massachusetts Institute of Technology, Computer Science and Artificial Intelligence Laboratory, Cambridge, MA, USA, In Proceedings of the IEEE International Conference on Computer Vision, Beijing, China, Oct. 2005, 8 pages.
Haveliwala, T., "Topic-Sensitive PageRank: A Context-Sensitive Ranking Algorithm for Web Search," IEEE Trans. Knowl. Data Eng., 15(4), 2003, pp. 784-796.
Huynh et al., "Time Quilt: Scaling up Zoomable Photo Browsers for Large, Unstructured Photo Collections," Apr. 2-7, 2004, CHI, Portland, OR, 4 pages.
Jing et al., "Google Image Swirl: A Large-Scale Content-Based Image Browsing System," Jul. 2010, Proceedings ICME, 1 page.
Jing et al., "PageRank for Product Image Search," Rich Media, Apr. 21-25, 2008, Beijing, China, pp. 307-315.
Jing et al., "VisualRank: Applying PageRank to Large-Scale Image Search," IEEE Transactions on Pattern Analysis and Machine Intelligence, vol. 30, No. 11, Nov. 2008, 14 pages.
Ke, Yan et al., "PCA-SIFT: A More Distinctive Representation for Local Image Descriptors," Proceedings of Computer Vision and Pattern Recognition, 2004, 8 pages.
Kennedy, L, et al., "Generating Diverse and Representative Image Search Results for Landmarks," in Prof. 17th International World Wide Web Conference (WWW2008), Beijing, China, Apr. 21-25, 2008, 10 pages.
Lowe, David G., "Local Feature View Clustering for 3D Object Recognition," Proceedings of the IEEE Conference on Computer Vision and Pattern Recognition, Dec. 2001, 7 pages, http://www.cs.ubc.ca/~lowe/papers/cvpr01.pdf.
Lowe, David G., "Distinctive Image Features from Scale-Invariant Keypoints," International Journal of Computer Vision, 60(2), 2004, http://www.cs.ubc.ca/~lowe/papers/ijcv04.pdf, downloaded May 18, 2012, 21 pages.
Mikolajczk, Krystian et al., "A Performance Evaluation of Local Descriptors," IEEE Transactions on Pattern Analysis and Machine Intelligence, vol. 27, No. 10, Oct. 2005, pp. 1615-1630.
Mikolajczyk et al., "A Performance Evaluation of Local Descriptors," Department of Engineering Science, University of Oxford, Oxford, United Kingdom, Oct. 6, 2004, 33 pages.
Nister, David et al., "Scalable Recognition with a Vocabulary Tree," Proceedings of IEEE Conference Computer Vision and Pattern Recognition, Jun. 2006, pp. 2161-2168.
Pampalk, "Limitations of the SOM and the GTM," Feb. 13, 2001, published on the Web, 11 pages.
Peterson, "Using Google Maps to Zoom Photographs," copyright 2008, downloaded from the Internet at http://forevermore.net/articles/photo-zoom/, on Aug. 16, 2011, 7 pages.
Quadrianto et al., "Kernelized Sorting," Dec. 2009, IEEE Trans. on Pattern Analysis and Machine Intelligence PAMI, 32(10): 1809-1821, 8 pages.
Rodden et al., "Does Organisation by Similarity Assist Image Browsing?," 2001, SIGCHI, Seattle, WA, 8 pages.
Rothganger, Fred et al., "3D Object Modeling and Recognition Using Local Affine-Invariant Image Descriptors and Multi-View Spatial Constraints," Conference on Computer Vision and Pattern Recognition, 2004, 47 pages.
Rothganger, F., et al., "3D Object Modeling and Recognition Using Local Affine-Invariant image Descriptors and Multi-View View Spatial Constraints," International Journal of Computer Vision, 2006, 66(3), pp. 231-259.
Simon, I., et al., "Scene Summarization for Online Image Collections," in Proc. 11th International Conference on Computer Vision (ICCV), 2007, 8 pages.

(56) References Cited

OTHER PUBLICATIONS

Unknown Author, "Image Cruiser," Preview, downloaded from the Internet at http://imagecruiser.jp/light/demo_en.html, on Sep. 13, 2011, 1 page.

Unknown Author, "Treemapping," Wikipedia, downloaded from the Internet at: http://en.wikipedia.org/wiki/Treemapping, on Aug. 25, 2011, 4 pages.

Vogelhuber, V., et al., "Face Detection Based on Generic Local Descriptors and Spatial Constraints," International Conference on Pattern Recognition (ICPR '00) 1 (2000), pp. 1084-1087, ftp://ftp.inrialpes.fr/pub/movi/publications/VogelhuberSchmid-icpr00/ps.gz.

Yang et al., "Semantic Image Browser: Bridging Information Visualization with Automated Intelligent Image Analysis," Nov. 2006, Proc. IEEE Symposium on Visual Analytics Science and Technology, pp. 191-198.

Bartell, "Optimizing Ranking Functions: A Connectionist Approach to Adaptive Information Retrieval," 1994, University of California, San Diego, pp. 64-65.

* cited by examiner

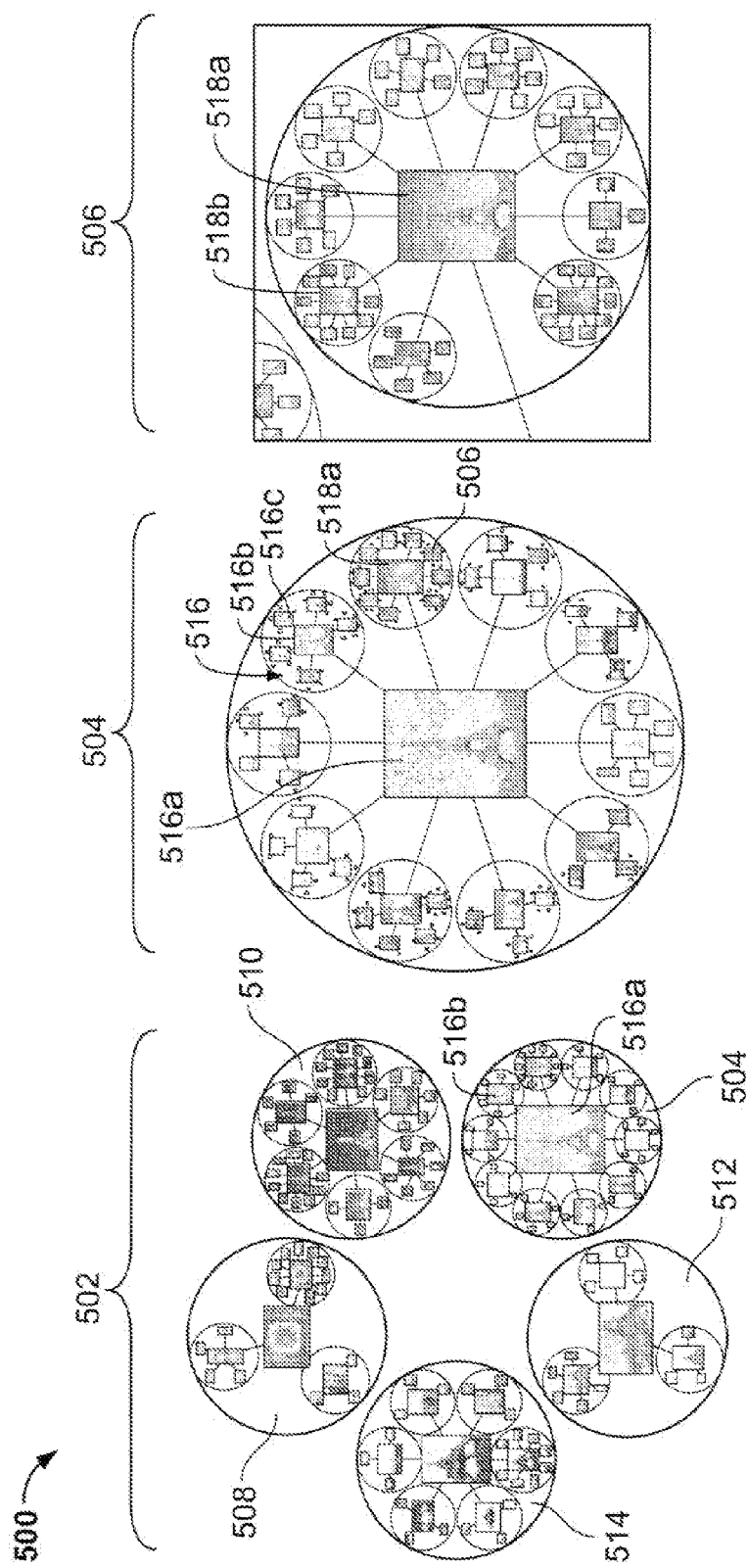

GROUPING OF IMAGE SEARCH RESULTS

CROSS-REFERENCE TO RELATED APPLICATIONS

This application is a continuation of and claims the benefit under 35 U.S.C. §120 of U.S. patent application Ser. No. 13/617,976, now U.S. Pat. No. 8,843,478, filed on Sep. 14, 2012 titled "Grouping of Image Search Results," which is a continuation of and claims the benefit of U.S. patent application Ser. No. 12/876,077, now U.S. Pat. No. 8,352,465, filed on Sep. 3, 2010 titled "Grouping of Image Search Results," which claims the benefit under 35 U.S.C. §119(e) of U.S. Provisional Application Ser. No. 61/239,723, filed on Sep. 3, 2009 entitled "Grouping of Image Search Results," and U.S. Provisional Application Ser. No. 61/261,719, filed on Nov. 16, 2009 entitled "Grouping of Image Search Results," the entirety of which are hereby incorporated by reference.

BACKGROUND

This specification relates to presenting image search results.

Conventional information retrieval systems, for example, Internet search engines, aim to identify resources (e.g., web pages, images, text documents, multimedia context) that are relevant to a user's needs and to present information about the resources in a manner that is most useful to the user. Internet search engines return a set of search results in response to a user submitted query. The search results identify resources responsive to a user's query. The identified resources can include varying types of content including documents, text, images, video, and audio.

In some information retrieval systems, a user can perform an image search. Typically, an image search is a search for image content responsive to an input query. An image can include a static graphic representative of some content, for example, photographs, drawings, computer generated graphics, advertisements, web content, book content. An image can also include a collection of image frames, for example, of a movie or a slideshow.

SUMMARY

This specification relates to presenting image search results.

Image search results can be presented to a user in a number of ways. For example, image search results can be presented as a collection of thumbnail images representing image resources responsive to the query and sorted, e.g., in a list, a diagram, a map, a file, or other data sorting structure. In some implementations, the image search results are displayed hierarchically, according to relevancy. Hierarchically displayed image search results typically present search results with a higher relevancy to a particular query more prominently than search results with lower relevancy to the same query.

In general, the systems and methods described in this specification provide techniques to identify a representative image result (e.g., a canonical image) for each of a number of clusters of images responsive to a given query. One or more image clusters can be presented in a hierarchical manner with respect to the identified representative images.

For example, a search system can use signals and ranking mechanisms to hierarchically cluster images for a group of search results. The system can provide clusters of image search results where each cluster of images includes a representation of a canonical image representing a highly relevant search result. Clusters of image search results can be nested such that a member of one cluster of images can be the canonical image for another cluster of images at a different hierarchical level.

The system can provide a interface for presenting and interacting with one or more images of hierarchical clusters of images. Image clusters can be represented by displayed canonical images for the respective clusters. Users can select particular image clusters to view images within that clusters. The images within a cluster can include one or more canonical images representative of a further cluster of images representing a cluster at another hierarchical level.

In general, one aspect of the subject matter described in this specification can be embodied in methods that include the actions of receiving an image query, the image query being a query for images; receiving ranked image search results responsive to the image query, the image search results each including an identification of a corresponding image resource; generating a similarity matrix for images identified by the image search results; generating a hierarchical grouping of the images using the similarity matrix; identifying a canonical image for each group in the hierarchical grouping using a ranking measure; and presenting a visual representation of the image search results based on the hierarchical grouping and the identified canonical images. Other embodiments of this aspect include corresponding systems, apparatus, and computer program products.

These and other embodiments can optionally include one or more of the following features. Identifying a canonical image for each group includes: identifying, for each group an image, an image having a highest image search rank; and selecting the image having the highest image search rank as the canonical image for that group. Identifying a canonical image for each group includes: identifying an image of the group as having a highest ranking according to the ranking measure; and selecting the image having the highest ranking as the canonical image for that group. Selecting the image having the highest ranking includes: calculating an image ranking for each image in the group including calculating a similarity between each image using one or more similarity metrics; and comparing the image ranking for each image to identify an image having the highest image ranking. Presenting a visual representation of the image search results includes: using a representation of one or more canonical images to represent one or more groups of images in the visual representation of the image search results.

The visual representation includes one or more first canonical images having a first size representing higher level image clusters and one or more second canonical images having a second smaller size associated with each first canonical image. Generating the hierarchical groups of images includes using hierarchical agglomerative clustering to group the image search results in a dendrogram structure and where the canonical image for each group corresponds to each cluster in the dendrogram. Generating the hierarchical grouping further includes generating a first number of clusters using the images in the similarity matrix, identifying canonical images for each cluster of the first number of clusters, and generating a second number of clusters using the identified canonical images for the first number of clusters.

In general, one aspect of the subject matter described in this specification can be embodied in methods that include the actions of receiving an image query; receiving ranked image search results responsive to the image query, the image search results including an identification of corresponding image resources; generating a similarity matrix for images identified by the image search results; generating a hierarchical grouping of the images using the similarity matrix; and identifying a canonical image for each group in the hierarchical grouping using a ranking measure. Other embodiments of this aspect include corresponding systems, apparatus, and computer program products.

These and other embodiments can optionally include one or more of the following features. The method further includes presenting an array of images representing a plurality of groupings of images from the hierarchical grouping; and receiving a selection of an image from the array of images; and presenting a hierarchical grouping of images associated with the selected image form the array of images. Presenting an array of images further includes identifying a first plurality of image grouping having a greatest strength; and identifying a second plurality of image groupings having a highest similarity relative to the first plurality of image groupings. Presenting the hierarchical grouping of images further includes presenting, in a first region, a representation of the array of images; and presenting, in a second region, a representation of the hierarchical grouping of images coupled to the representation of the array of images.

Particular embodiments of the subject matter described in this specification can be implemented so as to realize one or more of the following advantages. Representations of canonical images (e.g., thumbnails) can be used to graphically describe a cluster of image search results without requiring a user to review all available image search results. As a result, the user can quickly peruse the canonical images within the image search results to determine whether the image cluster includes images having user-desired content. In some implementations, the system displays more relevant image results larger than other image results to allow more screen space for image search results. Presentation of canonical images provides an overview of a range of image search results. This allows a user to explore image search results reflecting a general information space efficiently.

The details of one or more implementations are set forth in the accompanying drawings and the description below. Other features and advantages will be apparent from the description and drawings as well as from the claims.

BRIEF DESCRIPTION OF THE DRAWINGS

FIG. 5A-5C represent example graphical user interfaces used for presenting hierarchical image search results.

Like reference numbers and designations in the various drawings indicate like elements.

DETAILED DESCRIPTION

Figure 1:
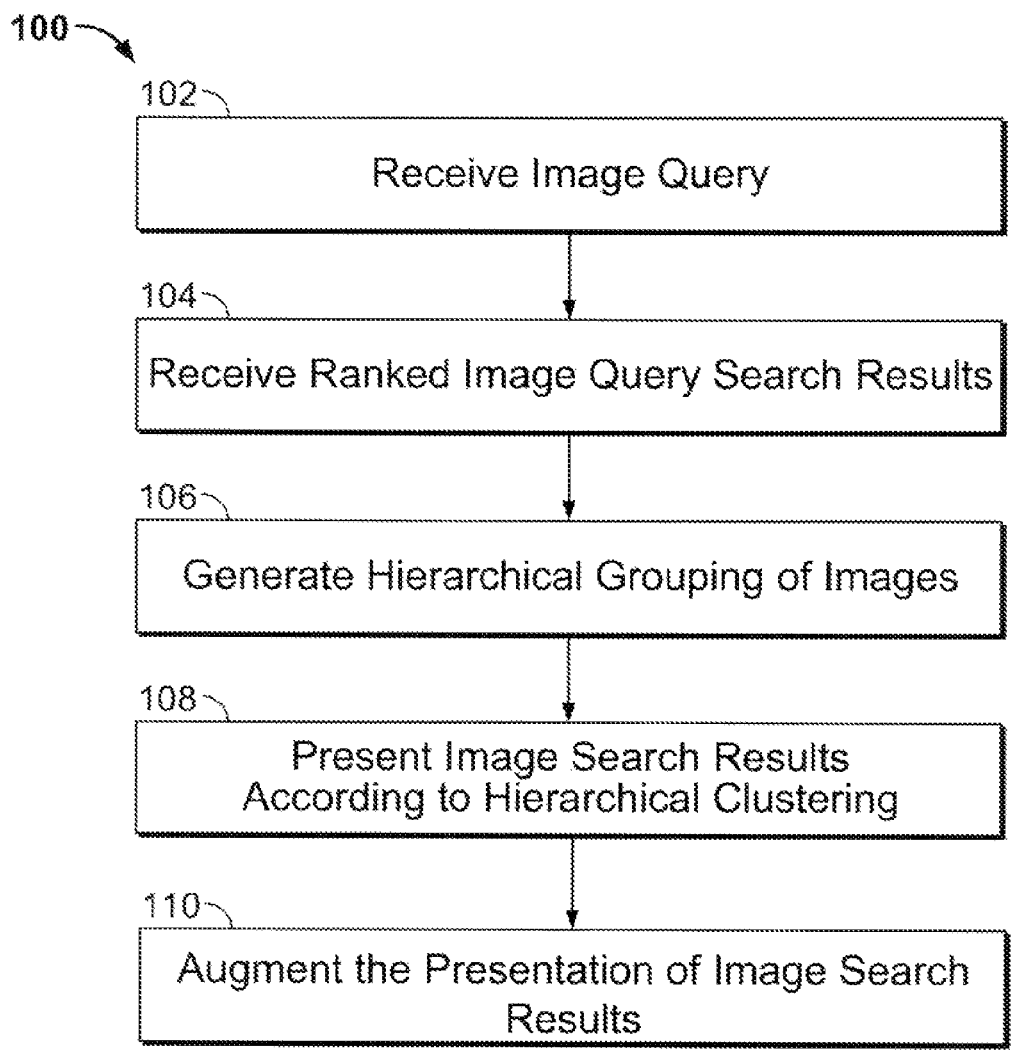
FIG. 1 is a flow diagram of an example method for presenting image search results.

FIG. 1 is a flow diagram of an example method 100 for presenting image search results. Image search results generally include thumbnail representations of one or more image resources that are determined to be responsive to a submitted search query. For convenience, the method 100 will be described with respect to a system (e.g., a search system), including one or more computing devices, that performs the method 100. Typically, representations of the image resources (e.g., a thumbnail) are presented rather than the actual image resources themselves, although it is possible to present the actual image resources. For convenience, the term image in the specification will refer to either an image resource or a representation of the image resource.

The system receives (102) an image query. An image query is a search query for particular image content responsive to the query. For example, a user can send the system a query that describes a particular image or type of image. The system can send the received image query to an image search engine that identifies search results.

The image query provides information about one or more images associated with a topic, a website, a webpage, an offline database, an online database, a transaction, a document, a photograph, a drawing, or other content. The image query includes one or more query terms identifying requested image content. The query terms can identify one or more search strings (e.g., red rose bouquet, apple, bakery logo), image features (e.g., color, texture, dimension), file type (e.g., bitmap, jpeg, tiff) or any combination of the above. Alternatively, in some other implementations, the query itself is an image.

The system receives (104) ranked image search results responsive to the image query. The image search results identify corresponding image resources relevant to the received image query. For example, a search system can include a ranking engine that ranks image search results responsive to a received query according to one or more criteria. The system then uses the ranked search results as an input to group images into an organized and highly relevant hierarchical structure.

The system generates (106) a hierarchical grouping of the images identified in the search results. For example, the system uses clustering techniques to perform a first level grouping of the images (e.g., an initial clustering of images identified from the image search results). The first level grouping of images can include clustering data using one or more hierarchical data clustering techniques, for example, according to a similarity between images identified in the search results. In some implementations, the system uses additional external inputs when generating hierarchical image clusters. For example, the system can use data from the user's profile to bias image search results when generating the hierarchical image clusters. One or more canonical images are selected for each group of images in the hierarchy. Techniques for selecting canonical images are described in greater detail below.

The system presents (108) one or more of the image search results according to the hierarchical clustering. Additionally, the system augments (110) the presentation of image search results according to user interaction. The image search results can be displayed in a particular hierarchy determined by one or more data clustering techniques. The displaying can include canonical images representing groups or clusters of images at different levels of the hierarchy. Example data clustering techniques are shown below with reference to FIGS. 3A-3B.

In some implementations, the system presents each cluster of image search results with a selected canonical image at the forefront (e.g., center of a circular area) and additional images in the background (e.g., surrounding a circular area). Alternatively, in some other implementations, the system presents clusters according to a single canonical image which can be expanded in response to user input to display other images in the next hierarchical level. The displayed image search results can be augmented in response to the user input, for example, to display different image search results (e.g., associated with a particular cluster or hierarchical level) or display image search results at different sizes. Augmenting the display can include animating changes, moving image search results, scaling image search results, and redrawing image search results corresponding to the user input.

In some implementations, only a system-selected portion of the represented images are initially presented within the search results. The system can display thumbnail images, reduced images, or geometric representations of images if, for example, real estate within the GUI is scarce. The system can also provide software controls for navigating through additional images. In some examples, a user can choose to zoom, pan, rotate, deemphasize, switch, shrink, copy, or otherwise manipulate images within the presented search results.

The system presents the image search results in graphical or diagram forms including, but not limited to a tree structure, a fan structure, a spherical structure, a dendrogram structure, or some arbitrarily shaped structure indicating a hierarchical flow. In some implementations, the presented visual representation of the image search results are combined with search results, sponsored links, advertisements, software controls, publisher content, images, video content, audio content, and other content.

Figure 2:
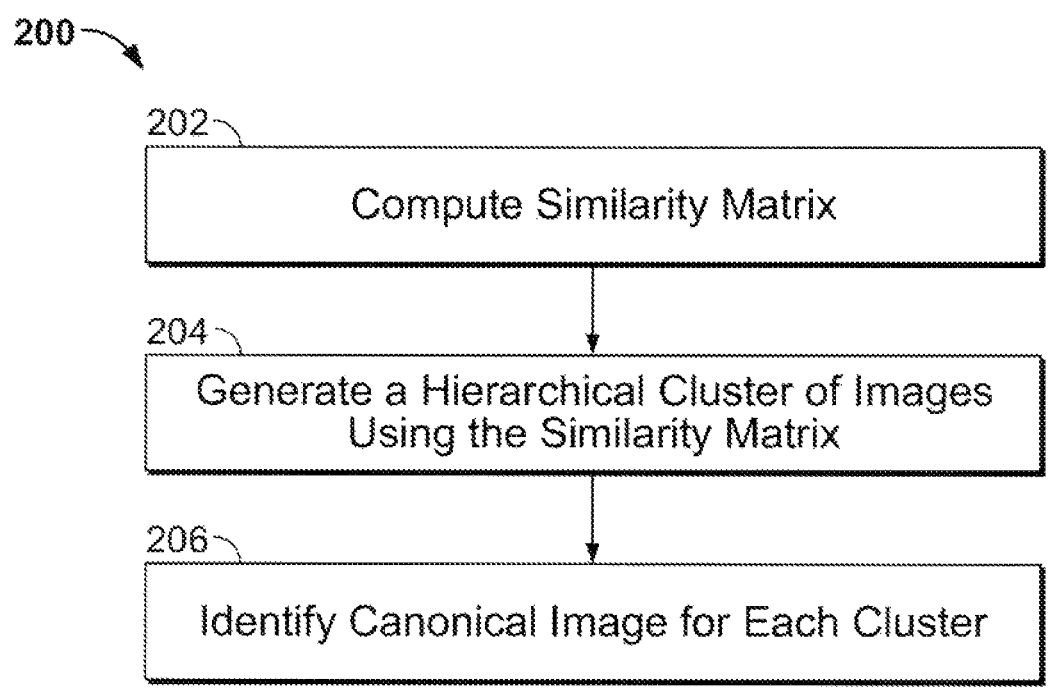
FIG. 2 is a flow diagram of an example method for generating an image hierarchy.

FIG. 2 is a flow diagram of an example method 200 for generating an image hierarchy. An image hierarchy can be displayed in various text-based or graphical structures. For convenience, the method 200 will be described with respect to a system, including one or more computing devices, that performs the method 200.

The system computes (202) a similarity matrix. A similarity matrix generally includes an N×N matrix of image results where each entry in the matrix is a similarity value associating two images. In particular, the images are the images identified by the search results. The similarity value represents a score identifying the similarity between a pair of images. Similarity can be calculated, for example, using color, texture, shape, or other image-based signals. In some implementations, image metadata is used in calculating similarity. For example, metadata identifying a location where or time when the image was captured, external information including text associated with the image (e.g., on a webpage), or automatically extracted metadata such as facial identification.

In some implementations, the system computes the similarity metrics according to one or more similarity metrics for the images identified by the search results. The similarity metrics can be based on features of the images. A number of different possible image features can be used including intensity, color, edges, texture, wavelet based techniques, or other aspects of the images. For example, regarding intensity, the system can divide each image into small patches (e.g., rectangles, circles) and an intensity histogram can be computed for each patch. Each intensity histogram can be considered to be a feature for the image.

Similarly, as an example of a color-based feature, the system can compute a color histogram for each patch (or different patches) within each image. The color histogram can be calculated using any known color space, such as the RGB (red, green, blue) color space, YIQ (luma (Y) and chrominance (IQ), or another color space. Histograms can also be used to represent edge and texture information. For example, histograms can be computed based on patches of edge information or texture information in an image.

For wavelet based techniques, a wavelet transform may be computed for each patch and used as an image feature, for example. The similarity metrics can alternatively be based on text features, metadata, user data, ranking data, link data, and other retrievable content.

The similarity metrics can pertain to a combination of similarity signals including content-based (e.g., color, local features, facial similarity, text, etc.), user behavior based (e.g., co-click information), and text based (e.g., computing the similarity between two sets of text annotations). Additionally, text metadata associated with the images can be used (for example, file names, labels, or other text data associated with the images). When using local features, the system typically computes the similarity based on the total number of matches normalized by the average number of local features. The similarity matrix or other structure can then be generated for the particular one or more similarity metrics using values calculated for each pair of images.

The similarity matrix can be computed for each unique pair of images in the image search results. For example, the system can construct a similarity matrix by comparing images within a set of images to one another on a feature by feature basis. Thus, each image has a similarity value relative to each other image of the search results.

Overall, higher scores are given to more similar images and lower or negative scores are given for dissimilar images. The system can, for example, use ranked image search results returned in response to a user query to generate a similarity matrix. The similarity matrix can be symmetric or asymmetric.

The system generates (204) a hierarchical cluster of image search results using the similarity matrix and according to a particular clustering technique. In particular, the similarity value for each pair of images can be treated as a distance measure. The system can then cluster the images according to a particular threshold distance. The threshold can, for example, provide a minimum number of clusters, or a minimum acceptable similarity value, to select an image for membership to a specific cluster. Example clustering techniques are described in greater detail below. In some implementations, similar groups of images are further grouped or categorized together to increasingly larger clusters, which allows a user to gradually navigate through the layers of the hierarchy to an image of interest.

In some alternative implementations, the system generates a hierarchical cluster of images using the similarity matrix and one or more additional image similarity measures. The additional image measures can, for example, include color, texture, shape, or other image-based signals. Additionally, non-image signals can be used to provide a similarity measure including, for example, text, hyperlinks, and user click data.

After generating a hierarchical clustering of images using the similarity matrix, the system identifies (206) a canonical image for each cluster. For example, the system identifies which image within each image cluster to promote or designate as the representative image for that particular cluster. The selection of a canonical image for each image cluster provides a "visual summary" of the semantic content of a collection of images. The "visual summary" also provides a mechanism to navigate a large number of images quickly.

In some implementations, one or more additional clustering iterations are performed. In particular, additional clustering can be performed using only the canonical images. This provides a refined and reduced set of image results for display.

The canonical image can be selected using a combination of one or more ranking mechanisms, mathematical techniques, or graphical techniques. The system can calculate the canonical images for each image cluster using an image ranking score, for example, the ranking score provided from the search system or an alternative ranking system e.g., a ranking derived based on links to and from the image, a VisualRank score, image tagging information, image similarity graphs, or other measures.

One example ranking mechanism includes promoting the highest ranked image from a set of image search results as the canonical image for a particular image cluster. For example, for a cluster of images x, y, and z, each image is assigned a ranking score within a set of search results as a whole (e.g., x=3, y=7, z=54). The system can use a ranking mechanism to select image "x" as the canonical image of the cluster based on it having the highest rank within that cluster.

In some implementations, the system computes an image similarity graph using image search results to determine a particular relevancy score for an image. The determined score can be used to select a canonical image for one or more of the image clusters. In general, image similarity graphs depict a graphical representation of images and their respective similarities. An image similarity graph is generated based on common features between images. The image similarity graph can provide a global ranking of images. The global ranking of images can be combined with other non-visual signals to determine the relevancy score. For example, text-based signals (e.g., hyperlinks, metadata) can be combined with visual features and graph analysis techniques to determine relevancy scores for a set of images. The canonical image can be selected based on the image of a cluster having a highest relevancy score with respect to the images in the cluster.

In some implementations, the system calculates and uses a calculated VisualRank to select the canonical image for an image cluster. VisualRank provides an image ranking based on visual hyperlinks among the images. VisualRank estimates a probability of each image in the search results being visited by users following the visual hyperlinks, which represent the visual similarity of images. The VisualRank score depends both on initial placement of the images and the collective visual similarities. Thus, if a user is viewing an image, other visually similar images may also be of interest. For example, if image u has a visual hyperlink to image v, then there is some probability that the user will jump from u to v. Additionally, images that are visited often are important and if an image is important and links to another image, it suggests that the other image is also important.

The similarity measure used in VisualRank uses local descriptors. In contrast to global features (e.g., color histograms and shape analysis), local descriptors contain more image information and are relatively stable under different transformations. Local descriptors generally describe elementary characteristics such as shape, color, texture or the motion, among others. Examples of local descriptors include Harris corners, Scale Invariant Feature Transform, Shape Context, and Spin Images. Images with more matched local descriptors are more likely to be visited by users following the resulting probabilistic visual hyperlinks and therefore are more visually similar.

For a set of images, the VisualRank can be calculated by: (1) generating local descriptors for the group of image search results, (2) constructing a collection of hash tables and indexing each local descriptor into each of the hash tables, (3) aggregating images with identical hash keys across all hash tables for each local descriptor, and (4) regrouping matched features by the images that can be associated with the local descriptor. Typically, image pairs are considered "matched" if the images share more than three matched descriptors. The similarity value between two images is computed according to the total number of matches normalized by their average number of local features. The highest similarity value represents the canonical image for an image cluster. Calculating VisualRank for a set of images is described in greater detail in Y. Jing and S. Baluja, "VisualRank: Applying PageRank to Large-Scale Image Search," IEEE Transactions on Pattern Analysis and Machine Intelligence, November 2008.

In some implementations, the system uses additional signals to identify a canonical image for a particular image cluster. The additional signals can include quality scores, image features, and other content based features. For example, content based features include the intensity of an image, edge based features of an image, metadata within an image, and text within an image. Other techniques of generating hierarchical image clusters and subsequently selecting respective canonical images can be used.

In some other implementations, ranking scores are calculated by analyzing image signals to determine a visual theme. For example, a number of images which contain a company logo can be retrieved in an online search query for the phrase "[company] logo." In some of these images, the logo is the main focus of the image, whereas, in others, it occupies only a small portion. The repetition of the logo in a large fraction of the images returned in the search query is a strong image signal that can be used to infer a common visual theme throughout the image set. The ranking scores can then be used to select canonical images for clusters.

In some implementations, the system injects standard image ranking results into the image similarity graph computation to bias an end result. For example, the system can use current web rankings of image content along with VisualRank to bias the new rankings such that highly ranked images are more likely to be placed near the top when the next ranking is performed. The biased or modified rankings can then be used to select canonical images for clusters.

Figure 3A:
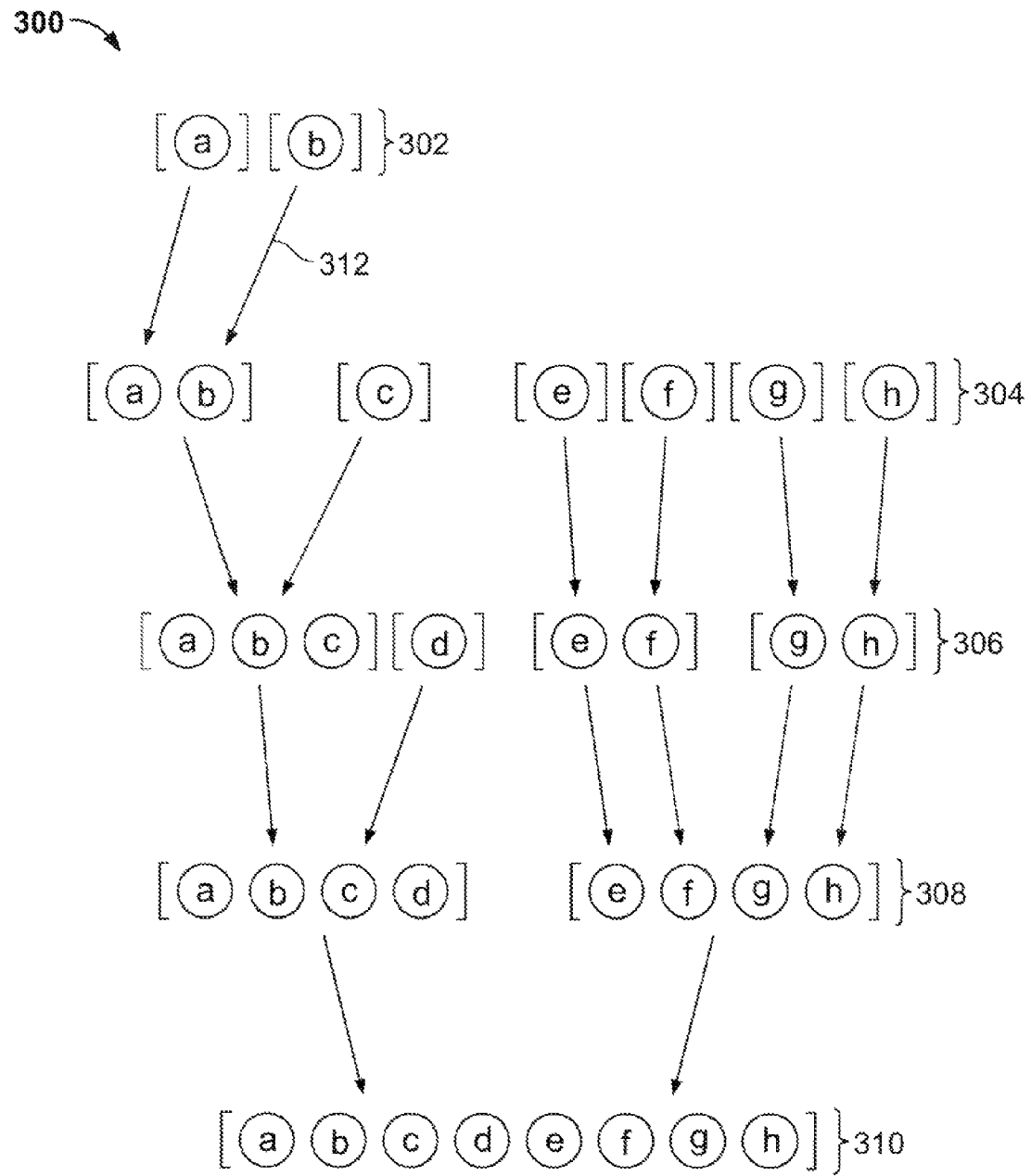
FIG. 3A is a block diagram of an example clustering diagram.

FIG. 3A is a block diagram of an example clustering diagram 300. The clustering diagram 300 can, for example, be created using the methods described in FIGS. 1 and 2 above. In general, clustering diagrams provide a graphical display of the assignment of objects into groups according to specified clustering criteria. For example, objects can be clustered according to similarity such that objects from the same group are more similar to one another and more dissimilar to objects from other groups. In some implementations, similarity is assessed according to a particular distance measuring technique using the values of the similarity matrix. One example distance measuring technique can use a rule where the similarity of two objects increases as the distance between the two objects decreases. Thus, the degree of dissimilarity of the two objects increases as the distance between the two objects increases.

In some implementations, the system implements a distance measuring scheme to provide the basis for determining a similarity calculation. For example, the system can implement a symmetric or asymmetric distance measuring techniques. Example distance measuring techniques to determine similarity include, but not limited to, the Euclidean distance, the Manhattan distance, the maximum norm distance, the Mahalanobis distance, or the Hamming distance.

Similarity calculations can influence the graphical shape of a clustering diagram, as some elements can be closer to one another when they are more similar and farther apart when the elements are less similar. Similarity calculations can also provide insight into selecting and presenting relevant image content to a user and/or search engine website. For example, search engines use combinations of similarity calculations to determine representative images to display within news articles, advertisements, and other content on a webpage.

The clustering diagram 300 is a dendrogram structure having a tree-like shape. The clustering diagram 300 illustrates an example arrangement of clusters generated by a hierarchical data clustering technique, for example, as described above. In some implementations, the system uses a combination of data clustering techniques to generate a grouping or clustering of image data. The system can implement one or more data clustering techniques including, but not limited to, hierarchical agglomerative clustering (HAC), k-medoids clustering, affinity propagation clustering, step-wise clustering, fuzzy clustering, quality threshold clustering, and graph-theoretic means clustering.

The example clustering diagram 300 depicts a top row of nodes 302 that represent data (e.g., particular objects or image search results). The clustering diagram 300 also includes a number of rows 304, 306, 308, and 310 that represent both data nodes and clusters to which nodes can belong (e.g., image search results and clusters of image search results). For example, in row 304 a cluster [a, b] is shown as well as individual nodes c, e, f, g, and h. More or fewer data nodes can be included in rows 302-310. In addition, any number of external data nodes may be imported into the clustering diagram 300, for example, to form data clusters.

In the clustering diagram 300, the data nodes and data clusters are linked using arrows, e.g., arrow 312. The arrows between the data and the clusters generally represent a degree of similarity in that the more nodes added to a cluster the less overall similarity there is in the cluster (e.g., images a and b can be very similar and clustered together but once a less similar image c is added to the cluster, the overall similarity incrementally decreases depending on the degree of similarity between images in the cluster).

In operation, the system builds the clustering diagram 300 from a number of individual data nodes. At each iteration (e.g., row of the dendrogram), a larger cluster is assembled using one or more of the above data clustering techniques and a similarity matrix associating the images identified by the image search results. The system builds a dendrogram (or other structure) given a set of data nodes and a similarity matrix defining the similarity relationships between the nodes. For example, an initial number of data clusters can be specified by the system and membership of the images in the initial clusters is based on a similarity score in the similarity matrix. The similarity matrix and other system data can then be used to convert a particular dendrogram (or other structure) to a hierarchical display.

In some implementations, the system uses an agglomerative (e.g., bottom up) data clustering technique by representing each element as a separate image cluster and merging the separate image clusters into successively larger groups. For example, the system can employ a Hierarchical Agglomerative Clustering (HAC) technique to generate the dendrogram diagram 300. The arrows shown in the dendrogram diagram 300 indicate an agglomerative clustering technique because the arrows depict a flow of combining the data 302 and additional data into larger image clusters as the diagram 300 grows downward. In contrast, the system can use a divisive (e.g., top-down) clustering technique that can begin with an entire set of items and proceed to divide the items into successively smaller clusters.

In some implementations, the system employs composite content based image retrieval (CBIR) systems in addition to ranking systems and data clustering techniques. Composite CBIR systems allow flexible query interfaces and a diverse collection of signal sources for web image retrieval. For example, visual filters can be used to re-rank image search results. These "visual filters" are generally learned from the top 1,000 search results using probabilistic graphical models (PGMs) to capture the higher order relationship among the visual features.

As shown in FIG. 3A, the clustering diagram 300 depicts row 302 with two individual images, namely, [a] and [b]. For the initial clustering, the system uses specified similarity metrics (e.g., a similarity image graph), a similarity threshold for the metric (e.g., a distance threshold), and an associated specified number of image clusters (e.g., a minimum set of image clusters). For example, the system retrieves or calculates similarity metrics and similarity thresholds for purposes of clustering related images.

After an initial clustering is performed, the images (e.g., data nodes) [a] and [b] in row 302 can be merged using the similarity (i.e., the distance between the images). For example, the images [a] and [b] are shown merged in line 304. The images [a] and [b] can also be merged with other data in row 304 or data in another subsequent row. In some implementations, the system applies logic to ensure a minimum number of image clusters are used in the calculations and merging actions. Providing a minimum number of image clusters can ensure the calculations do not immediately reduce all images into a single cluster, for example.

The clustering technique generated image clusters shown in rows 304-310. Particularly, the system performs a first merge of image clusters to generate row 304, for example, where the images [a] and [b] are combined and images [c], [d], [e], [f], [g], and [h] are introduced. The system then generates row 306 by merging images [a], [b], and [c] and separately merging images [e] with [f] and [g] with [h]. The system also introduces a new image [d] in row 306. A similar process is performed to merge images [a], [b], [c], and [d] into cluster [a b c d] and images [e], [f], [g], and [h] into cluster [e f g h]. In a similar fashion using any number of similarity thresholds and merges, the system can generate the cluster [a b c d e f g h] in row 310. In some implementations, a single similarity threshold can be used to generate the dendrogram 300 in its entirety. In some implementations, the system continues clustering image clusters into fewer clusters according to decreasing threshold similarity values until the dendrogram structure 300 is created.

In some implementations, the system uses binary system data (e.g., data used to build a dendrogram) and domain knowledge to generate a particular clustering precision. For example, the system defines a set of minimum similarity thresholds ranging from zero to one, where one is exactly similar and zero is completely dissimilar. The system uses the similarity thresholds to "cut" the dendrogram into clusters. The "cut" operation provides a particular precision of clustering. In some implementations, the similarity threshold correlates to the distance between two images. That is, the two closest images that meet the minimum similarity threshold are generally merged. As an example, the dendrogram 300 depicts a scenario where the system determined the similarity threshold to be 0.1.

In some implementations, the system computes an image similarity graph using image search results. The image similarity graph can provide pair wise image similarities where each edge of the graph represents the similarity of the two images. These similarities can be combined with other non-visual signals. For example, text-based signals (e.g., hyperlinks, metadata) can be combined with visual features and graph analysis techniques to retrieve representative images.

Upon completing a particular level of image clustering, the system determines a final hierarchy by combining the dendrogram structures generated for each similarity threshold value into one dendrogram tree (not shown). The system can use the final hierarchy for each image cluster to select one image per image cluster with the highest image rank according to a particular ranking scheme (e.g., search rank or VisualRank) as the canonical image for the respective image cluster. For example, the image in each cluster with the highest ranking can be selected as the representative canonical image for each image cluster. Thus, the end result is a single canonical image representing a cluster of one or more peripheral images.

Figure 3B:
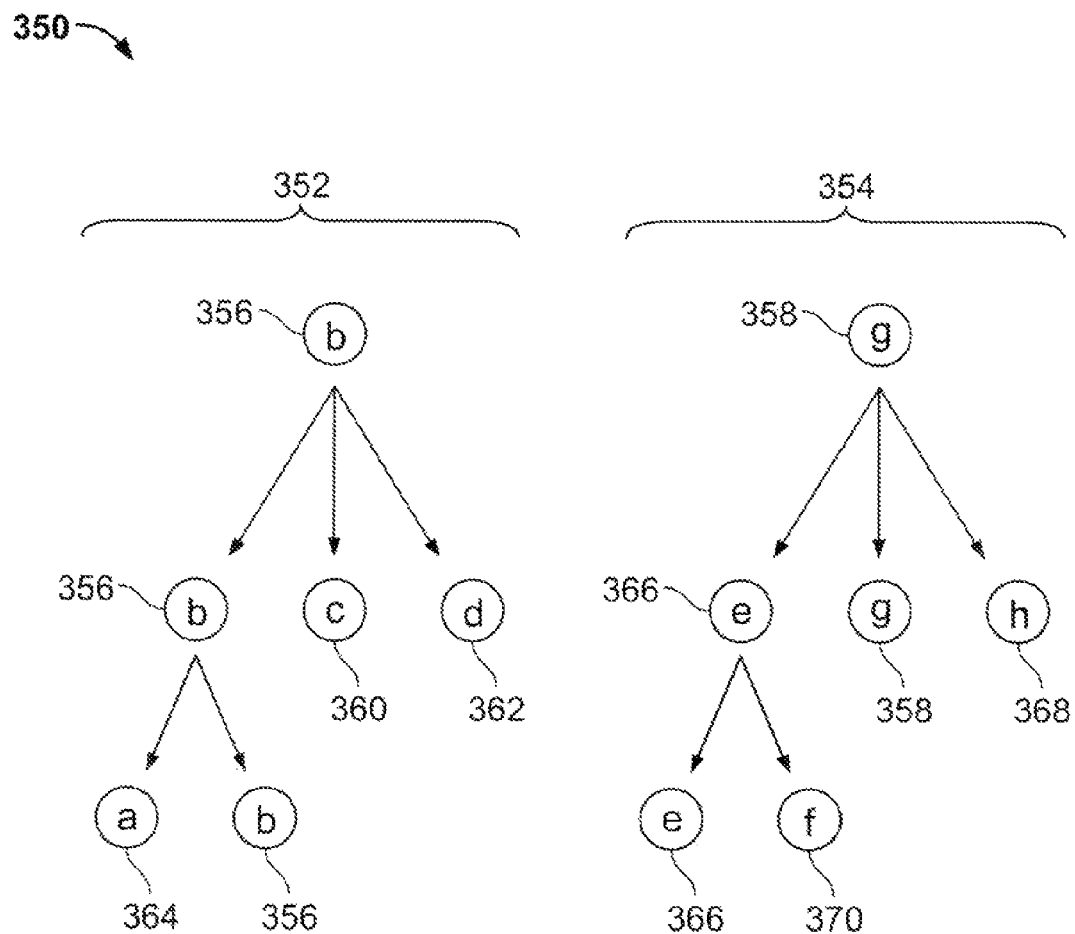
FIG. 3B is a block diagram of the example clustering diagram of FIG. 3A narrowed to select a canonical image.

FIG. 3B is a block diagram of a narrowed clustering diagram 350. The clustering diagram 350 is an example of narrowing the dendrogram in FIG. 3A into two final image clusters 352 and 354, from which to select canonical images. As shown, the system selected an image [b] 356 as the canonical image for the image cluster 352. Similarly, the system selected the image [g] 358 as the canonical image for the image cluster 354.

The canonical images 356 and 358 can be provided in a visual presentation where each image 356 and 358 is linked to a particular group of images based on the clustering. For example, as shown in FIG. 3B, the canonical image 356 is linked to the images [c] 360, [d] 362, and itself. In addition, the image [b] 356 is linked in a lower level of the dendrogram 350 to the image [a] 364. In a similar fashion, the canonical image [g] 358 is linked to the images [e] 366, [h] 368, and itself. In addition, the image [e] 366 is linked to the image [f] 370 in a lower level of the dendrogram.

FIG. 3B shows image clusters 352 and 354 in a dendrogram shape. The system can alternatively provide the single canonical images 356 and 358 linked to respective groups of images in a tree structure, a fan structure, a spherical structure, or some arbitrarily shaped structure indicating a hierarchy and a canonical image for each image cluster. In some implementations, each group of images is linked with another group of images. Thus, one or more clustered hierarchies of images and their respective canonical images can be generated, e.g., for presentation to a user for selection and/or viewing. FIGS. 4A, 4B, 4C, 4D, 4E, 5, and 6A-6D describe examples of graphical output provided by the system after performing one or more data clustering techniques on image search results.

In general, a data clustering technique can be used to generate values indicating similarity between particular features computed for two images. The data clustering techniques provide a mechanism to arrange groups of images in a hierarchical way. The hierarchy can be used to provide the user with a navigable structure to descend to a desired level of the hierarchy of image search results. The tables below provide example pseudocode for various data clustering techniques, namely, a hierarchical agglomerative clustering (HAC) technique (Table I), a step-wise clustering technique (Table II), a k-medoids clustering technique (Table III), and an affinity-propagation clustering technique (Table IV).

An example implementation of HAC is shown in pseudo-code in Table I below. In Table I, the VisualRank is computed, one or more dendrograms are assembled using, for example, the HAC technique, a hierarchy is determined using the dendrograms output from the HAC technique, and the canonical image is selected using the determined hierarchy. In this example, the canonical image for a set of images is tabulated in the variable "canonical_image." In some implementations, the VisualRank is computed at a later time in the technique. For example, the system can compute the VisualRank after assembling a dendrogram or other hierarchical structure, but before selecting a canonical image for a particular image cluster.

TABLE I

VR = Compute-VisualRank( );
Dendo = Compute-Hac( );
Hierarchy = RefineDendo(threshold_list);
for i = 1:sizeof(hierarchy)
   canonical_image(i) = argmax_j(VR(Hierarchy(i, j)));

The HAC technique can be used to generate a hierarchy from individual images by progressively merging image clusters. The hierarchy level associated with an image can indicate specific similarities between the image and other images. For example, the system generates distance matrices and threshold values to determine similarities between images. As shown in FIGS. 3A and 3B, the system can employ the HAC technique to cluster image search results in a dendrogram structure.

HAC techniques generally include determining minimum, maximum, and mean distances between images in each pair of clusters for purposes of creating distance matrices and/or dendrograms and other mapping structures. Each new merged image cluster occurs at a greater distance between clusters than the previous merged image cluster. In some implementations, the system determines a stopping point for the HAC technique. For example, the system determines when a maximum distance between image clusters is reached (e.g., distance criterion) or when a minimum image cluster threshold is met (e.g., cluster minimum).

Other clustering techniques can be employed by the system to generate a set of images having similar relevancy to one another. For example, Table II below illustrates a step-wise clustering technique used to generate a collection of images after a first round of clustering has been performed. Once the clustering is performed, the system can compute a VisualRank on a set of images, for example, to select a canonical image for each cluster. The system can also continue to perform clustering after canonical images have been selected, for example, to further narrow image search results based on different similarity thresholds. In this example, the system identifies similarity thresholds or "cuts" at three points (e.g., 0.1, 0.3, and 0.8). The "cuts" provide a further narrowing of the search results to a specific degree of relevancy. In Table II, the final canonical image for each group is tabulated in the variable "corpus."

TABLE II corpus = all-images.
VR = Compute-VisualRank( );
for t = [0.1 0.3 0.8]
   clusters = Compute-Hac(corpus, t)
   for c = 1:sizeof(clusters)
      canonical_image(c) = argmax_j(VR(clusters(c, j)));
   corpus = canonical_image;

An example implementation of the k-medoids technique is shown in pseudo-code in Table III below. The HAC technique shown in Table I above is replaced with the k-medoids technique. The k-medoids technique partitions images into groups and attempts to minimize squared error (i.e., the distance between points labeled to be in a group and a point designated as the center of that group). The k-medoids technique includes arbitrarily selecting [k] images as medoid points out of [n] data points where [n] >[k], associating each image to a most similar medoid, randomly selecting a nonmedoid image [I], and computing the total cost [S] of swapping the initial medoid image to [I]. If [S]<0, then the technique swaps the initial medoid with the new one (i.e., if [S]<0, then there will be new set of medoids). The technique is generally repeated until no change is determined in the medoids.

TABLE III

```
corpus = all-images.
VR = Compute-VisualRank( );
for t = 1:n
    clusters = K-medoids(corpus, k)
    for c = 1:sizeof(clusters)
        canonical_image(c) = argmax_j(VR(clusters(c, j)));
    corpus = canonical_image;
```

An example implementation of the affinity propagation technique is shown in pseudo-code in Table IV below. The HAC technique shown in Table I above is replaced with the affinity propagation technique. The affinity propagation technique receives input measures of similarity between pairs of images and contemporaneously considers all data points as potential exemplars. Particularly, real-valued messages can be exchanged between image data points until a high quality set of canonical images and corresponding image clusters are determined. Additional details on affinity propagation can be found in Frey and Dueck, "Clustering by Passing Messages Between Data Points," Science vol. 315, pp 972-976 (2007).

TABLE IV

```
corpus = all-images;
VR = Compute-VisualRank( );
for preference = [0.1 0.3 0.8]
    clusters = Aff-propagation(corpus, preference)
    for c = 1:sizeof(clusters)
        canonical_image(c) = argmax_j(VR(clusters(c, j)));
    corpus = canonical_image;
```

The techniques described above are provided as examples for clustering images in a relevant manner and determining a canonical image for each particular image cluster. Accordingly, other methods and techniques can be implemented and/or combined to cluster images and determine canonical images for each cluster.

In some implementations, the system performs an image clustering process in an iterative manner such that each iteration of clustering refines the set of images. Any number of iterations can be performed to determine and present an appropriate image clustering diagram for a user. For example, the system can cluster images using the HAC technique, the affinity propagation technique, the k-medoids technique, or other technique in combination or separately.

The system can then use the VisualRank or other ranking mechanism to find the canonical image from each cluster. Upon determining relevant canonical images, the system can remove all non-canonical images and repeat the clustering process using the same technique or another technique. Performing iterative clustering provides the advantage of improving the visual performance of the presentation content provided to the user such that the user is presented with highly relevant images.

FIGS. 4A-4E represent example graphical user interfaces (GUIs) used for presenting hierarchical image search results. The GUIs shown in FIGS. 4A-4E enable a user to view and/or customize a display of the image search results according to image clusters and canonical images for each cluster. In some implementations, the GUIs are zoomable user interfaces (ZUIs). A ZUI is a graphical user interface that allows users to change the scale of a viewed area in order to see more detail or less detail. Users can use the ZUI (displayed in FIGS. 4A-4E) to pan across the virtual surface in two dimensions and zoom into images and/or objects of interest. For example, if the user zooms into an image, it may be represented as a small dot, then a thumbnail of the image, then a full sized page of the image, and then a magnified view of the image. Alternatively, zooming or panning by a user can result in the generation of a new representation of the image search results resulting from the user action (e.g., displaying a different region of the image search results or a different level of the hierarchy of image search results).

Figure 4A:
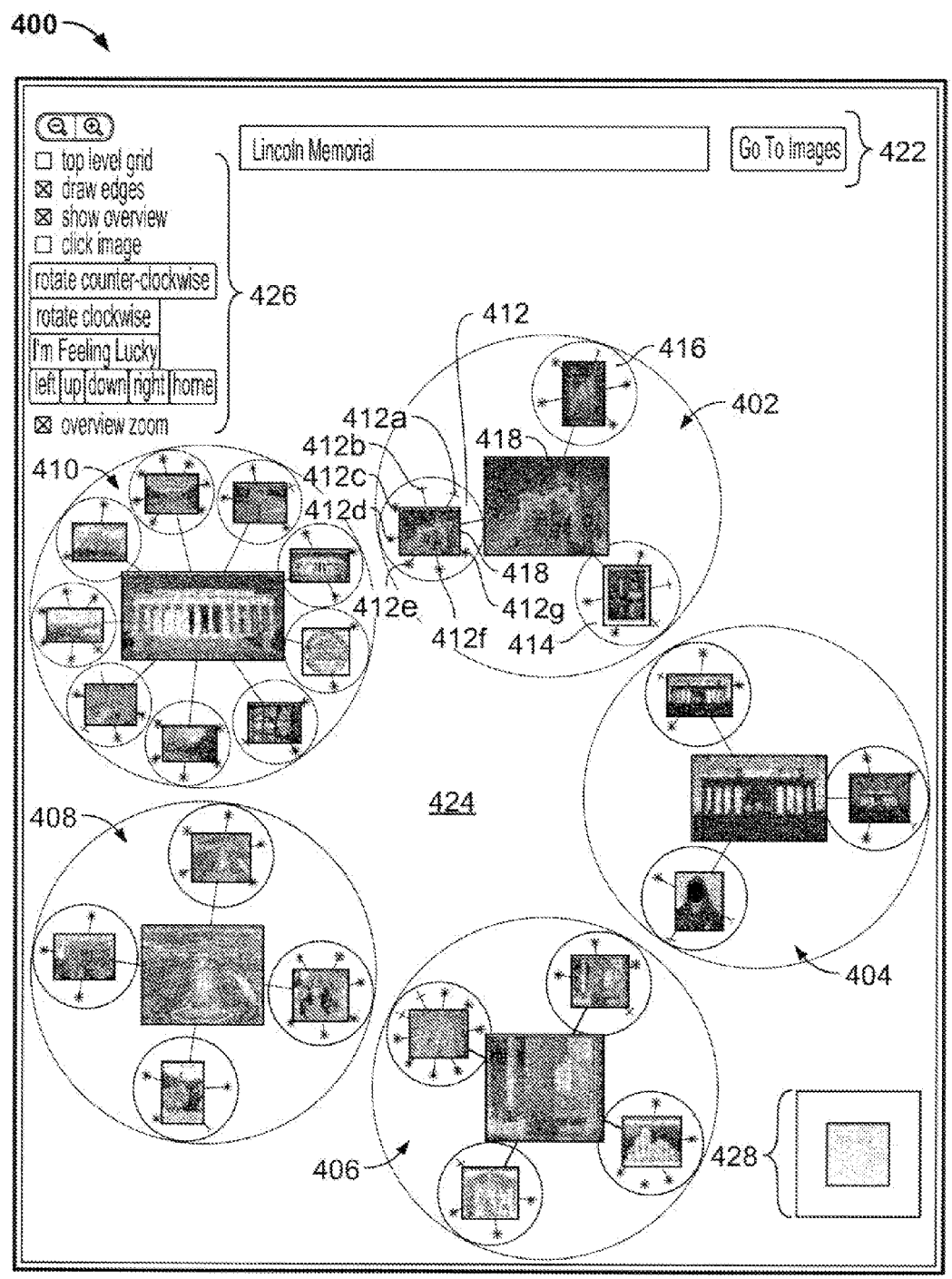
FIGS. 4A-4E represent example graphical user interfaces used for presenting hierarchical image search results.

As shown in FIG. 4A, a graphical user interface 400 includes five top level (e.g., parent) image clusters 402, 404, 406, 408, and 410. The screenshot 400 can be generated by the system if, for example, the system receives image search results responsive to an image query for the phrase "Lincoln Memorial." Although FIG. 4A depicts five top level image clusters, any number of image clusters can be displayed within the GUI 400. The image clusters shown in screenshot 400 are circular in shape. However, image clusters can take any shape that depicts a particular hierarchy including dendrograms, polygons, lines, spheres, flowcharts, file trees, and other 2-D or 3-D shapes.

The GUIs represented in FIGS. 4A-4E depict relationships between images using shape structure, distance, connection lines (e.g., spokes), or lack of connection lines. The various connection lines represent the relative cluster organization of the images in the hierarchy.

The image clusters 402-410 each contain a number of peripheral image clusters centered on a canonical image. For example, the image cluster 402 includes three peripheral image clusters 412, 414, and 416, all related to the "Lincoln Memorial" in this example (e.g., generated in response to an image search query associated with "Lincoln Memorial"). The peripheral image clusters can include child images or child image clusters. For example, the image cluster 412 includes child images 412a, 412b, 412c, 412d, 412e, 412f, and 412g connected to a canonical image 418 (i.e., the canonical image for the image cluster 412). In some implementations, peripheral image clusters do not include child images and thus the peripheral image cluster includes one image which represents the canonical image for that particular image cluster.

The child images 412a-g are each members of image cluster 412 represented by canonical image 418. Each of the child images 412a-g are canonical images for their respective clusters. As shown in image cluster 402, child images can be mapped in a similar shape to a parent image cluster. Alternatively, child images can be mapped in a different shape. In some implementations, child images are placed nearer or farther away from other child images or parent image clusters based on a ranking score or similarity threshold value.

In some implementations, child images are also attached to child image clusters (e.g., grandchildren to a top level parent image cluster). The grandchild images and/or grandchild image clusters represent an additional hierarchical layer of image results. Each grandchild image cluster is represented by a particular canonical image. Further hierarchal levels can be presented as the user zooms into the displayed images results.

In operation, a user enters an image search query into a query field 422. For example, the user entered an image query into query field 422 for the phrase "Lincoln Memorial." The system sends the image query to an image search engine and receives a collection of search results responsive to the query.

The system performs a number of calculations, arranges and/or clusters the search results according to those calculations, and then selects one image for each image cluster as the canonical image. For example, in the image cluster 402, the system determined that an image 418 within the child image cluster 412 provided the most representative image for the top level image cluster 402.

Accordingly, the system promoted the image 418 as the canonical image for the image cluster 412 and the image cluster 402. In a similar fashion, the system selects canonical images for the image clusters 404, 406, 408, and 410. In some implementations, the system selects one canonical image for each cluster within a set of search results. In some implementations, the system selects a canonical image for the entire set of presented search results in addition to selecting a canonical image for each individual image cluster. For example, the system can select a canonical image for all presented search results and further, can optionally place the selected canonical image in a center location 424.

Referring to FIG. 4A, the GUI 400 also includes a navigation control 426. The user can activate the navigation control 426 to traverse the search results within the GUI and to configure viewing options. For example, the user can use the navigation control 426 to rotate images and to move or pan around the search results within the screenshot 400. In some implementations, the navigation control 426 is used to enable zooming options. For example, a zoom box 428 can be toggled on or off using a selectable option within the navigation control 426.

The zoom box 428 displays a thumbnail image of a set of search results. In general, the zoom box 428 provides a "map" used to determine a location within the search results, for example, the depth (e.g., zoom level) within the search results hierarchy. For example, the zoom box 428 depicts an overview of how far a user has navigated throughout a set of search results. Thus, the user can view the zoom in or zoom out status for the set of search results. A user can zoom in and out of search results by selecting images, clusters, and/or connection lines. In the example shown in FIG. 4A, the user has not selected any images (e.g., image search results) within the screenshot 400. Thus, the zoom box 428 depicts a thumbnail view of all available search results.

Other tools can be integrated into the navigation control 426. For example, the navigation control 426 can include cropping tools, email tools, print tools, mirroring tools, rotational tools, cluster/shape building tools, and other tools. A user can choose to deemphasize, shrink, or otherwise manipulate images within a set of presented search results.

The images displayed in FIG. 4A are user-selectable. For example, a user can select an image in FIG. 4A to instruct the system to retrieve an associated resource represented in the selected image. The resource may be a link, a file, an advertisement, or other resource. The user can also select an image in FIG. 4A to adjust the view of the image within a screen (e.g., zoom in or zoom out on the image). For example, a user can select image 418 to view an enlarged (e.g., zoomed) image. When the user selects the image 418, the system enlarges the image 418 and can also enlarge connected images or peripheral images within the same image cluster, for example.

In some implementations, selecting an image and subsequently enlarging (e.g., zooming) one image cluster may reduce the amount of GUI space provided for other image clusters. Thus, the user can easily view the zoomed image cluster, while the unselected search results are shrunken, panned, or removed from the viewing window. In some implementations, when a zoom operation is performed, the canonical image for each image cluster does not expand as much as the child images. Consequently, the system can display larger child and grandchild images since the canonical image does not expand proportionally with the child and grandchild images.

In some implementations, the images displayed in FIG. 4A can be navigated using a scroll wheel or navigation buttons without actually "selecting" or "clicking" an image. For example, users can zoom-in based on the center of the image cluster being displayed or based on a particular cursor position when, for example, the user is using a scroll wheel on a joystick, mouse, or keyboard device. The user can also select on one or more image or cluster and be presented with a link or link location for more information about the image or cluster.

Figure 4B:
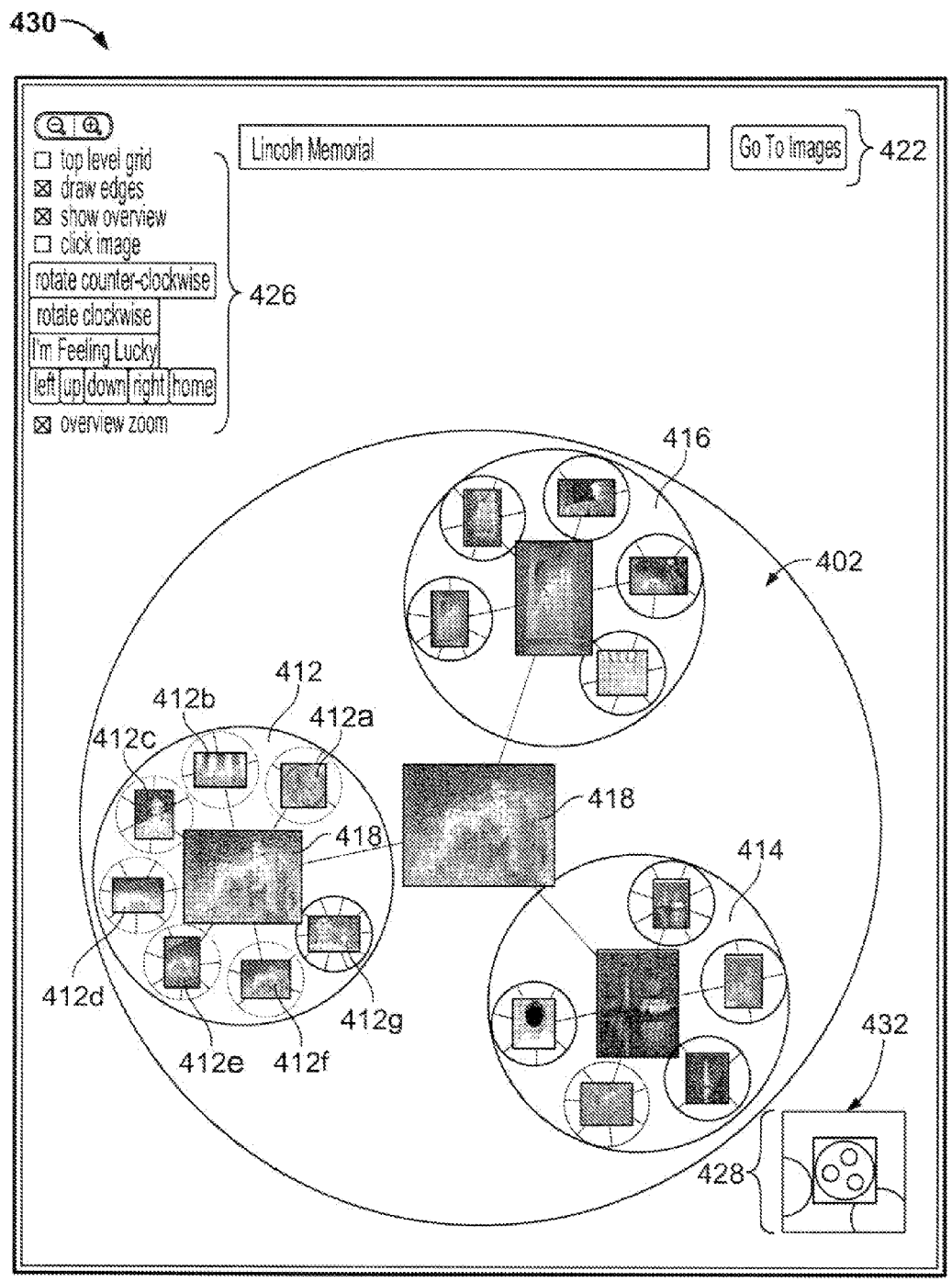

FIG. 4B is an example graphical user interface 430 illustrating a zoom action performed on the user interface of FIG. 4A. The graphical user interface 430 can be generated by the system if, for example, the system receives an image query for the phrase "Lincoln Memorial" and a user selects a thumbnail image to invoke a zoom action.

In general, a user can select a portion of a thumbnail image within a set of search results. In the depicted example, the user selected the image 418 within the cluster 402 shown in graphical user interface 400 (FIG. 4A). Selecting image 418 enables the system to zoom and center image 418 within the graphical user interface 430. Accordingly, the graphical user interface 430 depicts a zoomed version of the image cluster 402 including the image 418 as the canonical image for the entire cluster 402.

In some implementations, additional images are shown enlarged within the graphical user interface 430. For example, the image clusters 412, 414, and 416 all include nested image clusters that also include images. After a user selects an image to zoom in on, the system zooms in on the surrounding image clusters as well. For example, the graphical user interface 400 represents the child images 412*a-g* as dots at the ends of connection lines. After the user zooms a nearby image, the dots become images 412*a-g* (e.g., thumbnail representations of the image resources), as illustrated in graphical user interface 430 (FIG. 4B).

The zoom action also provides more detail to other images within the graphical user interface 430. For example, each image within the image cluster 412 includes additional dots which represent another layer of images. Similar to the zoom process described above, the user can select another image within an image cluster to view more details of the image search results. When at a deepest level of the hierarchy, the search results represent individual image search results without connections to deeper clusters of image search results.

In general, zooming in or out of image clusters within the search results does not modify the predetermined canonical image selections. For example, once the system determines to display any or all of the search results, the canonical images have already been specified and remain constant until a user changes a search term or other search setting. Therefore, the image 418 remains the canonical image overall for the depicted search results shown in FIGS. 4A-4E. Other canonical images within other displayed image clusters are displayed with their respective image clusters.

The zoom box 428 (FIG. 4B) depicts the new zoomed in location displayed in the graphical user interface 430. For example, a thumbnail view of the image cluster 402 is shown selected in the zoom box 428. The user can, for example use control 426 to navigate and adjust the GUI. The user can also navigate by moving a rectangle control 432 within the zoom box 428. The zoom box 428 also provides the user with information as to what is shown relative to a larger structure. For example, the content shown in the rectangle control 432 corresponds to the viewing screen and also provides a user with spatial context as to where the viewing screen content is located relative to a larger cluster display.

Figure 4C:
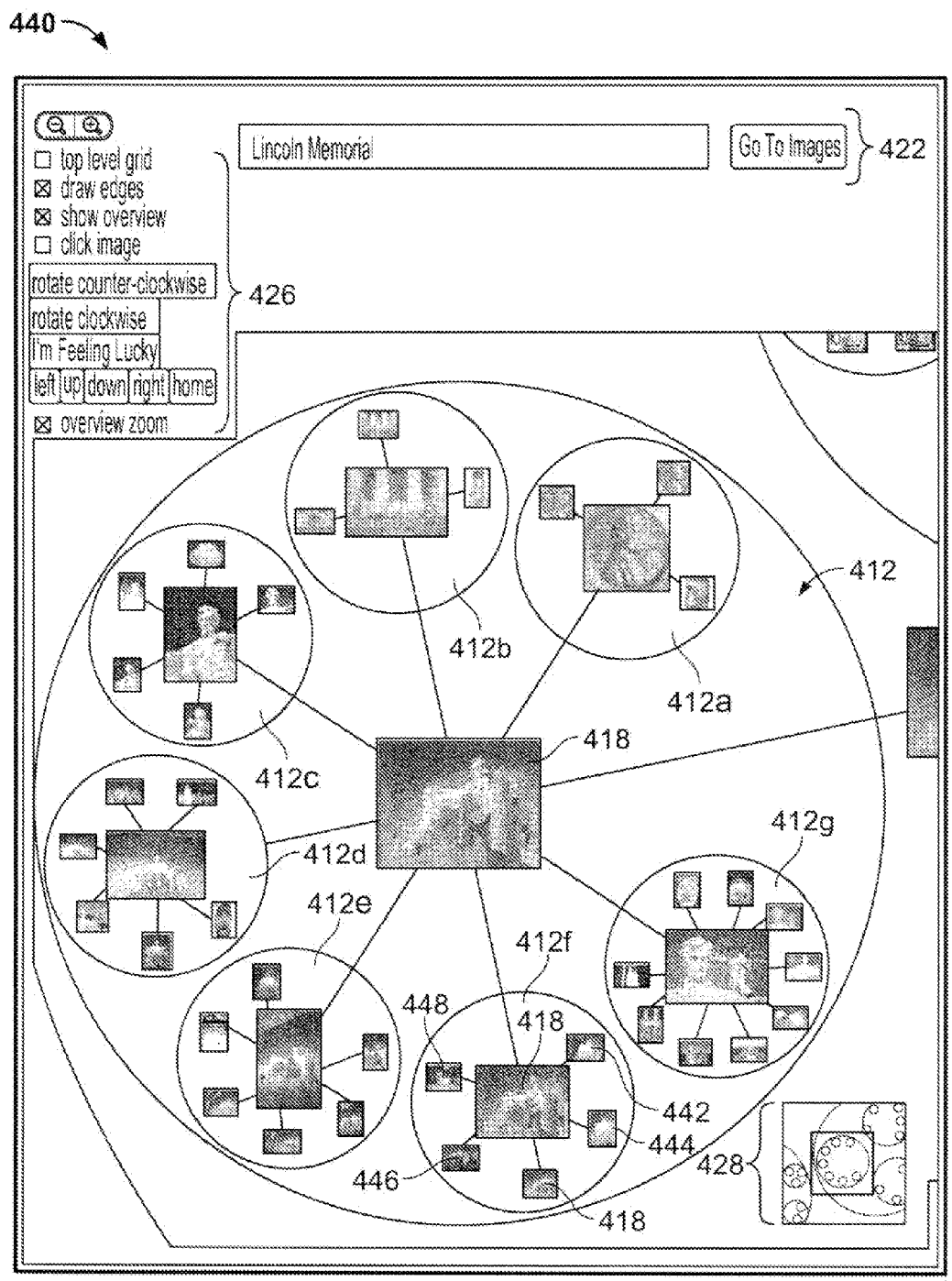

FIG. 4C is an example graphical user interface 440 illustrating a zoom action performed on the interface of FIG. 4B. The graphical user interface 440 can be generated by the system if, for example, the system receives an image query for the phrase "Lincoln Memorial" and a user selects an image. Here, the user performs a zoom in action by selecting an image (e.g., image 418) within the image cluster 412 in graphical user interface 430 (FIG. 4B). In response, the system displays the graphical user interface 440, which includes the zoomed image clusters 412a-g. In addition, the peripheral images surrounding the image clusters 412a-g are shown in a thumbnail view. For example, the image cluster 412f is shown with a canonical image 418 in the center of the cluster 412f and child images 442, 444, 446, 448, and 418 (selected as the canonical image).

The zoom box 428 (FIG. 4C) depicts the new zoomed in location displayed in the graphical user interface 440. For example, a thumbnail view of the image cluster 412 is shown selected in the zoom box 428.

Figure 4D:
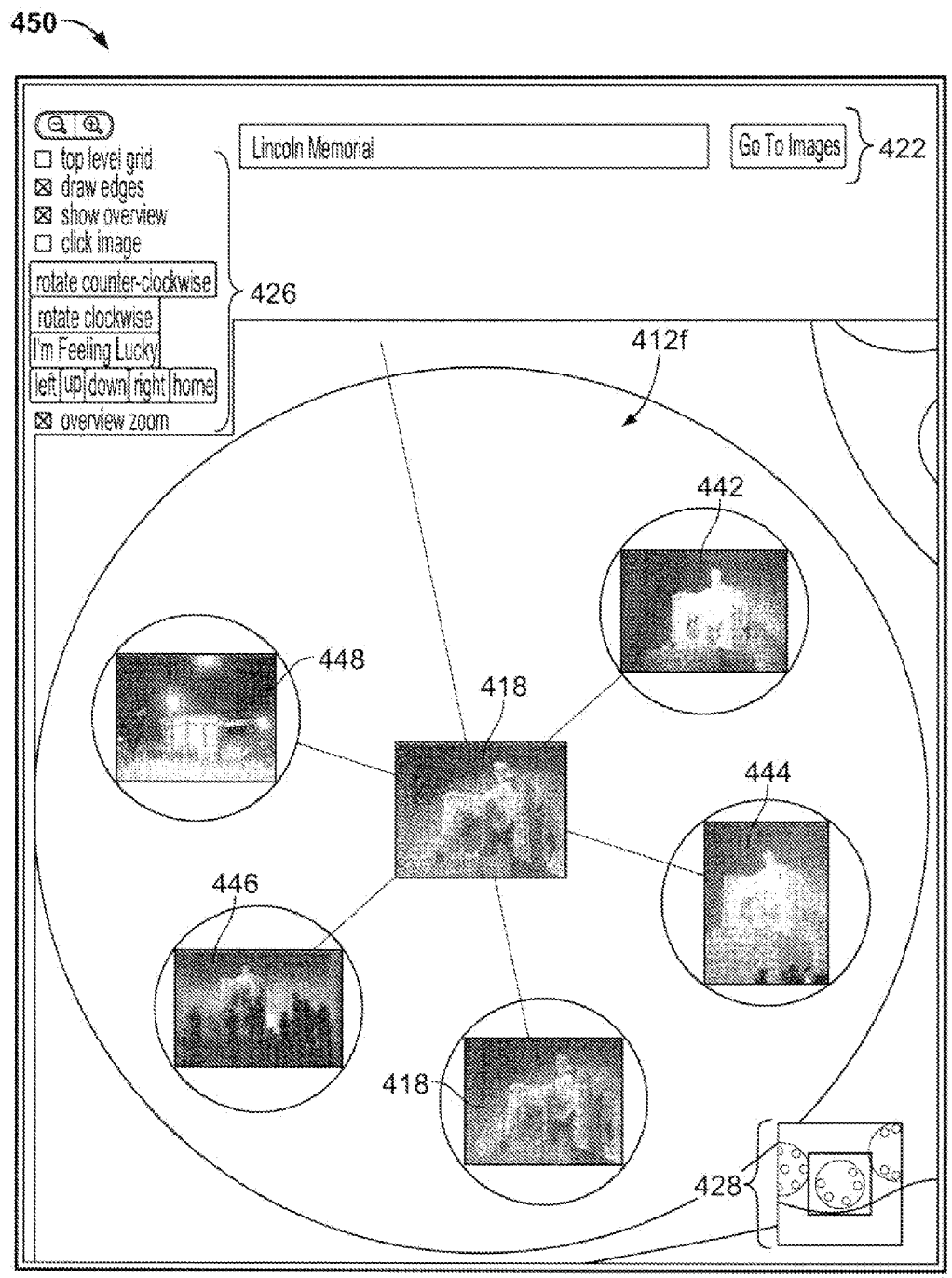

FIG. 4D is an example graphical user interface 450 illustrating a zoom action performed on the interface of FIG. 4C. The graphical user interface 450 can be generated by the system if, for example, the system receives an image query for the phrase "Lincoln Memorial" and a user selects an image. Here, the user performs a zoom in action by selecting an image within the image cluster 412 in graphical user interface 440 (FIG. 4C). In response, the system displays screenshot 450 which includes a zoomed image cluster 412f and a centered canonical image 418. In addition, the graphical user interface 450 includes the peripheral images 442, 444, 446, 448, and the canonical image 418 surrounding the canonical image 418.

The zoom box 428 (FIG. 4D) depicts the new zoomed in location displayed in the graphical user interface 450. For example, a thumbnail view of the image cluster 412f is shown selected in the zoom box 428.

Figure 4E:
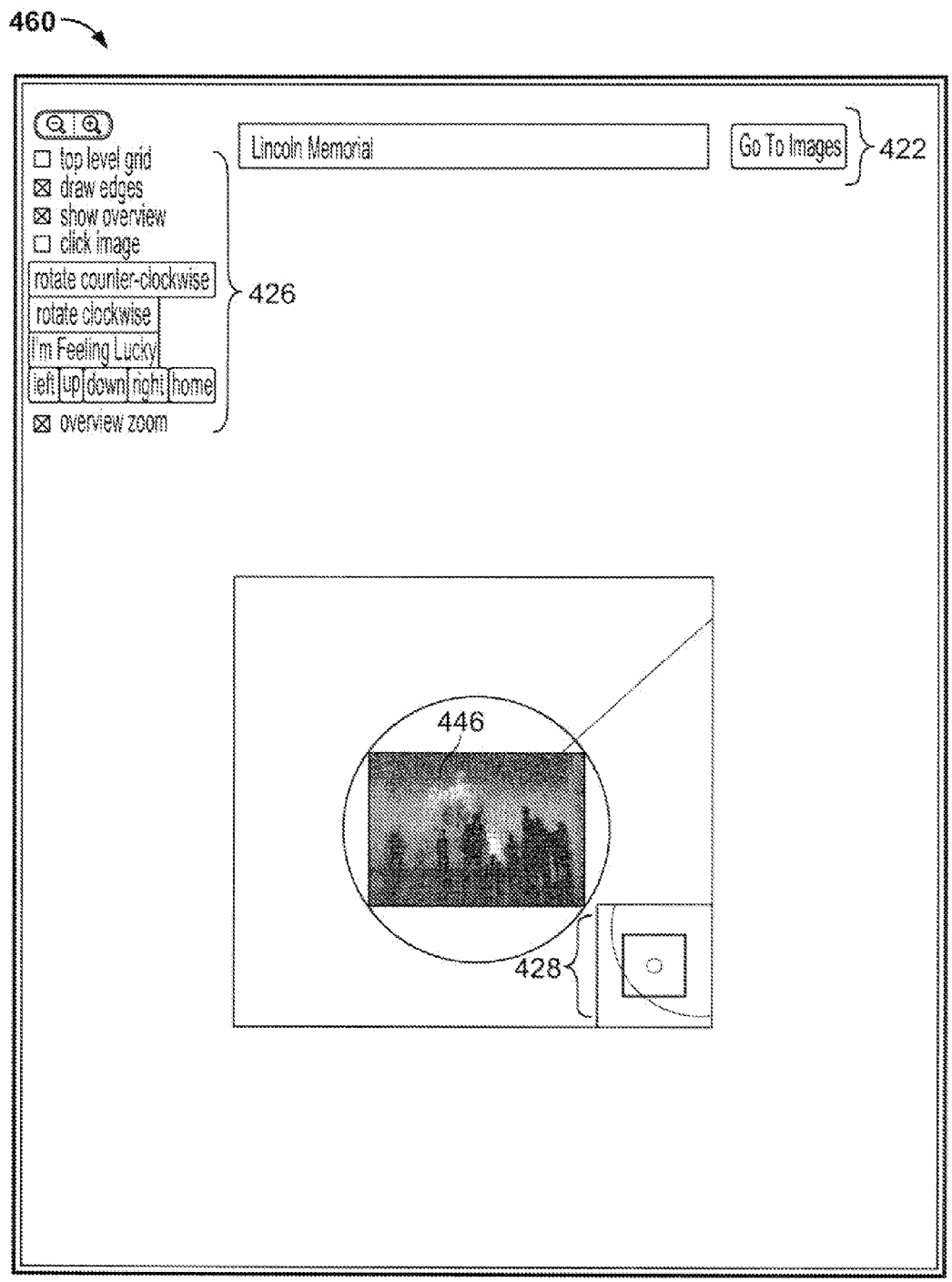

FIG. 4E is an example graphical user interface 460 illustrating a zoom action performed on the interface of FIG. 4D. The graphical user interface 460 can be generated by the system if, for example, the system receives an image query for the phrase "Lincoln Memorial" and a user selects an image. Here, the user performs a zoom in action by selecting the image 446 within the image cluster 412f in screenshot 450 (FIG. 4D). In response, the system displays graphical user interface 460 that includes the user-selected image 446. The user then selects image 446 may represent the search result that the user intended to find when entering the search query for the phrase "Lincoln Memorial." In this example, the user-selected image 446 was not represented by the system as the canonical image for an image cluster. However, the grouping of images around the canonical image 418 provides the user reference to several images having similar characteristics. Thus, the system clustered similar image search results and promoted a canonical image within each cluster. The canonical image generally graphically "describes" the cluster of search results without requiring the user to review all search results. As an advantage, the user can quickly peruse the image search results by honing in on desired features depicted in a representative image for each cluster. The zoom box 428 (FIG. 4E) depicts the new zoomed in location displayed in the graphical user interface 460.

In some implementations, the user can select one or more controls within control 426 to zoom out, rotate images, pan around within the graphical user interface 460, or otherwise manipulate the search result view. For example, if the selected image 446 does not satisfy the user's image search query, the user can zoom out to find another image search result.

FIGS. 5A-C represent example graphical user interfaces 500 used for presenting hierarchical image search results. The graphical user interfaces 500 include respective graphical user interfaces of three image cluster diagrams 502, 504, and 506 representing the search query for "Eiffel Tower" at three different hierarchical levels. The image cluster diagram 502 shown in FIG. 5A can be generated by the system if, for example, the system receives an image query for the phrase "Eiffel Tower." For example, the image cluster diagram 504 shown in FIG. 5B shows a zoom in action performed on an image cluster within the image cluster diagram 502. Similarly, the image cluster diagram 506 shown in FIG. 5C shows a zoom in action performed on an image cluster within the image cluster diagram 504.

The image cluster diagram 502 includes five top level (e.g., parent) image clusters 504, 508, 510, 512, and 514. The image cluster diagram 502 also includes children arranged radially around the inner edge of a circle, and a canonical image for each image cluster. A user can select any one of the images or clusters shown in the cluster diagram 502. For example, the user can select an image 516 (in the image cluster 502) to zoom in and view more detailed data of each of the children within a particular cluster. In some implementations, the user can select an image within image cluster diagram 502 and the system can retrieve information from the image such as a link, a file, an advertisement, or other content.

In some implementations, as the zoom in occurs, each child image cluster includes a single image that also includes grandchild images. For example, the user selects the image cluster 504 (within the image cluster 502). The system receives the selection and displays the zoomed image cluster 504 with the canonical image 516a in the center and several child clusters arranged radially around the canonical image 516a. In the depicted example, the image cluster 504 also includes a grandchild image cluster 516. The grandchild image cluster 516 includes an image cluster 516b as the canonical image of the child cluster 516 and a great grandchild image cluster 516c. The great grandchild image cluster 516c is shown promoted as the canonical image 516b of the grandchild image cluster 516 and finally to the canonical image 516a of the parent image cluster 504.

In a similar fashion, the grandchild clusters are arranged around additional image clusters. Here, the user selects an image 518a within the image cluster 504. The user-selected image 518a, in this example, is not the canonical image of the image cluster 504. The user-selected image represents the canonical image for the image cluster 506. The system displays the image cluster 506 with the user-selected image 518a as the canonical image. As shown in the image cluster 506, upon receiving an image selection from the image cluster 504, the system performed a zoom in operation to present the user with refined search result options within the image cluster 506 where the image 518a is represented in a child cluster as image 518b.

FIGS. 6A-6D represent example graphical user interfaces used for presenting hierarchical image search results. The graphical user interfaces shown in FIGS. 6A-6D enable a user to view and/or customize a display of the image search results according to image clusters and canonical images for each cluster. Similar to the above FIGS. 4A-4E, the graphical user interfaces shown in FIGS. 6A-6D depict relationships between images using shape structure, distance, connection lines (e.g., spokes), or a lack of connection lines. In some implementations, images which are shown larger represent images chosen as canonical images to represent a particular cluster.

Figure 6A:
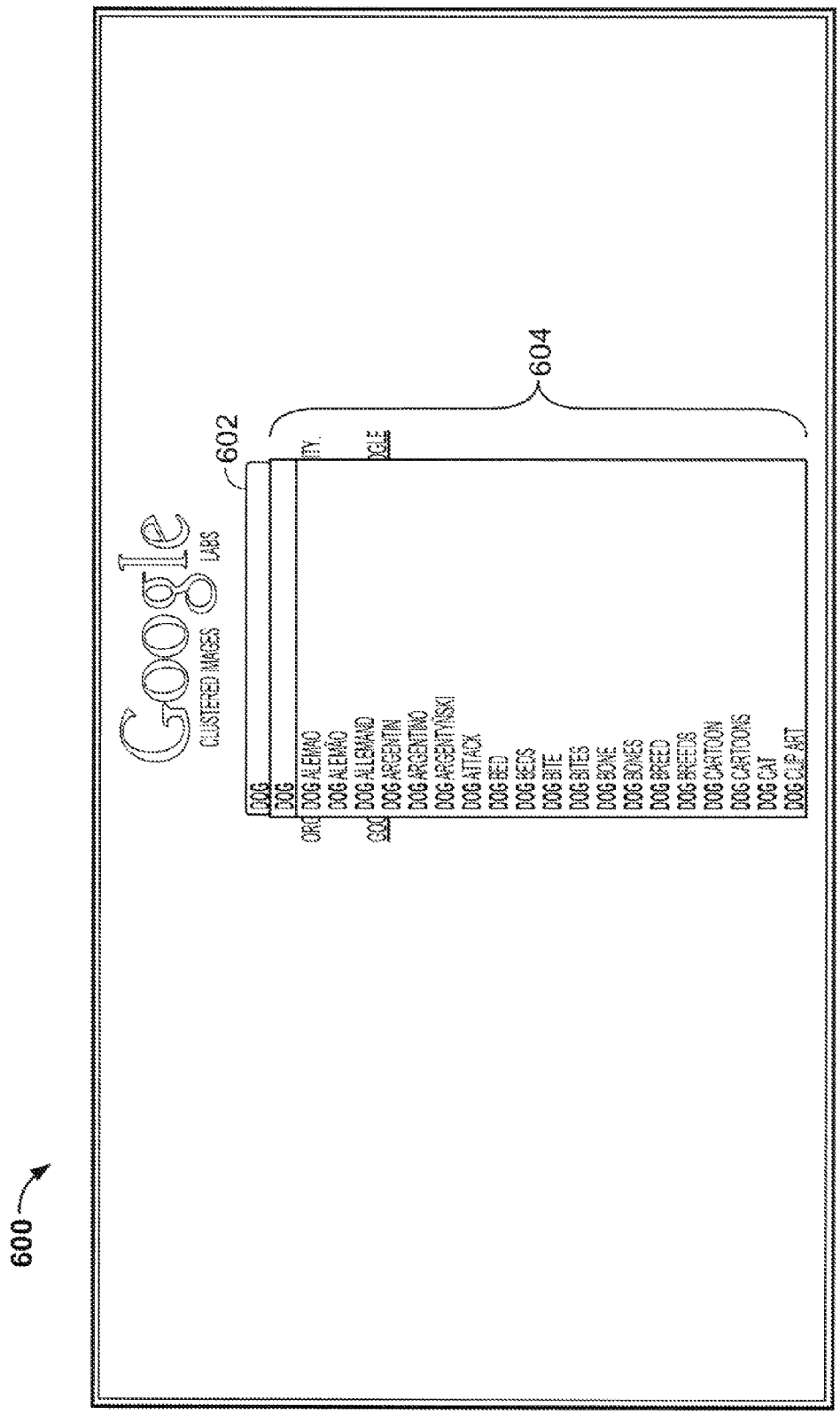
FIGS. 6A-6D represent example graphical user interfaces used for presenting hierarchical image search results.

As shown in FIG. 6A, an image search session is depicted showing a graphical user interface 600. In this example, a user entered an image query for the term "dog" into image query control 602. The image query control 602 provides search suggestions in a dropdown box 604 to guide the user while entering search query terms. The system receives the user's search query, performs the search query, and returns image query results. Here, the image query results include various images and drawings related to the term "dog."

Figure 6B:
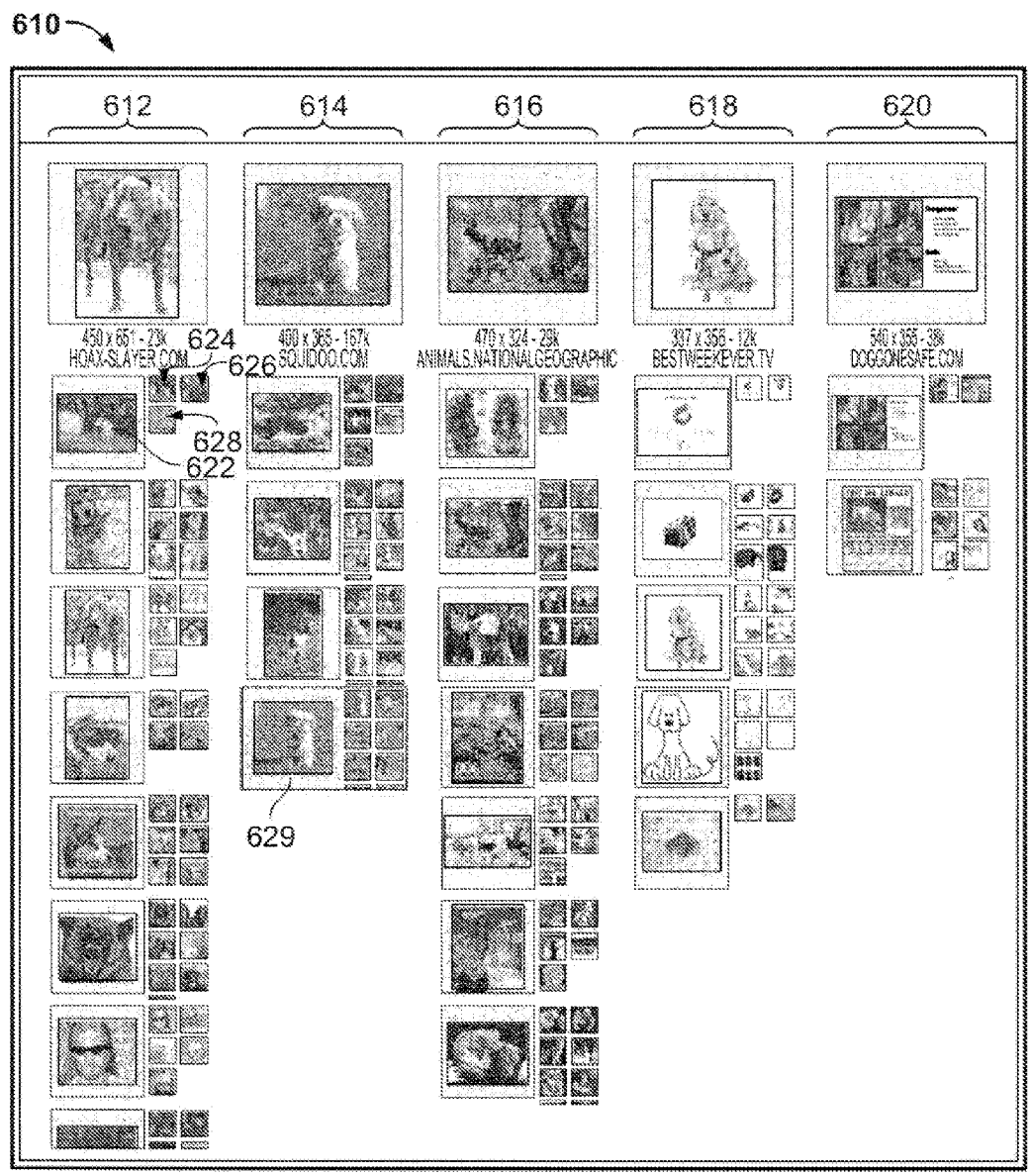

FIG. 6B is an example graphical user interface 610 illustrating an image query result display. The graphical user interface 610 includes five top level (e.g., parent) image clusters 612, 614, 616, 618, and 620. Although FIG. 6B depicts five top level image clusters, any number of image clusters can be displayed within the GUI 610. In this example, the image clusters are arranged hierarchically from the top down and are rectangular in shape.

In addition, the image clusters 612-620 are shown with a system-selected canonical image at the top of the graphical user interface 610 and clusters of images with respective canonical images displayed according to relevancy from top to bottom. Under each canonical image, the blocked clusters each including at least one medium image (e.g., image 622) and up to six smaller child images (e.g., images 624, 626, and 628). Each of the child images (e.g., images 624, 626, and 628) can represent a canonical image of a grandchild cluster.

A user can select an image or an image cluster within the graphical user interface 610. FIG. 6B depicts a selection box around an image cluster 629 indicating that the user selected the image cluster 629. Upon selecting the image cluster 629, the system displays a graphical user interface 630 (FIG. 6C) with the image cluster 629 beginning to expand (e.g., pop up) from a small display to a larger display. For example, the user selects the image cluster 629 and the image cluster expands and overlays a portion of the graphical user interface 630.

Images within the image cluster 629 can expand proportionally with a user-selected image. For example, if the user selects a child image within the image cluster 629, the child image may expand more than the original canonical image. In some implementations, if the user selects an image other than the canonical image, the system swaps the user-selected image and the canonical image in the display. In some implementations, when a user selects a child level cluster, all of the grandchildren images are expanded. In some implementations, great-grandchildren images are expandable.

Figure 6C:
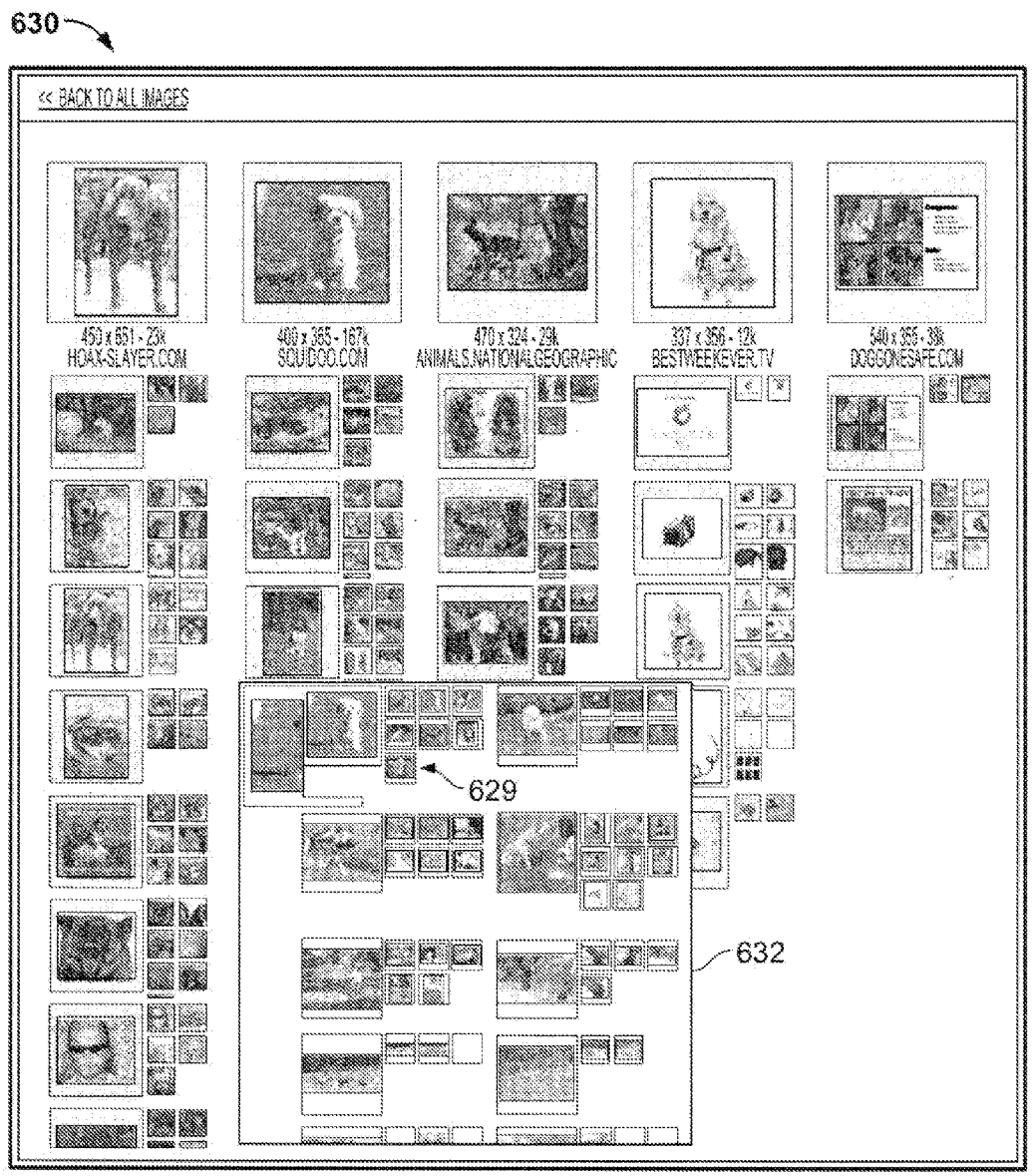

In some implementations, a user performs a mouse over action to view further detail about an image cluster or a specific image. For example, if the user places the cursor over the image cluster 629, the system can provide an expanded view of the cluster. As shown in FIG. 6C, an expanded view 632 is enlarged as an overlay on the graphical user interface 630.

Figure 6D:
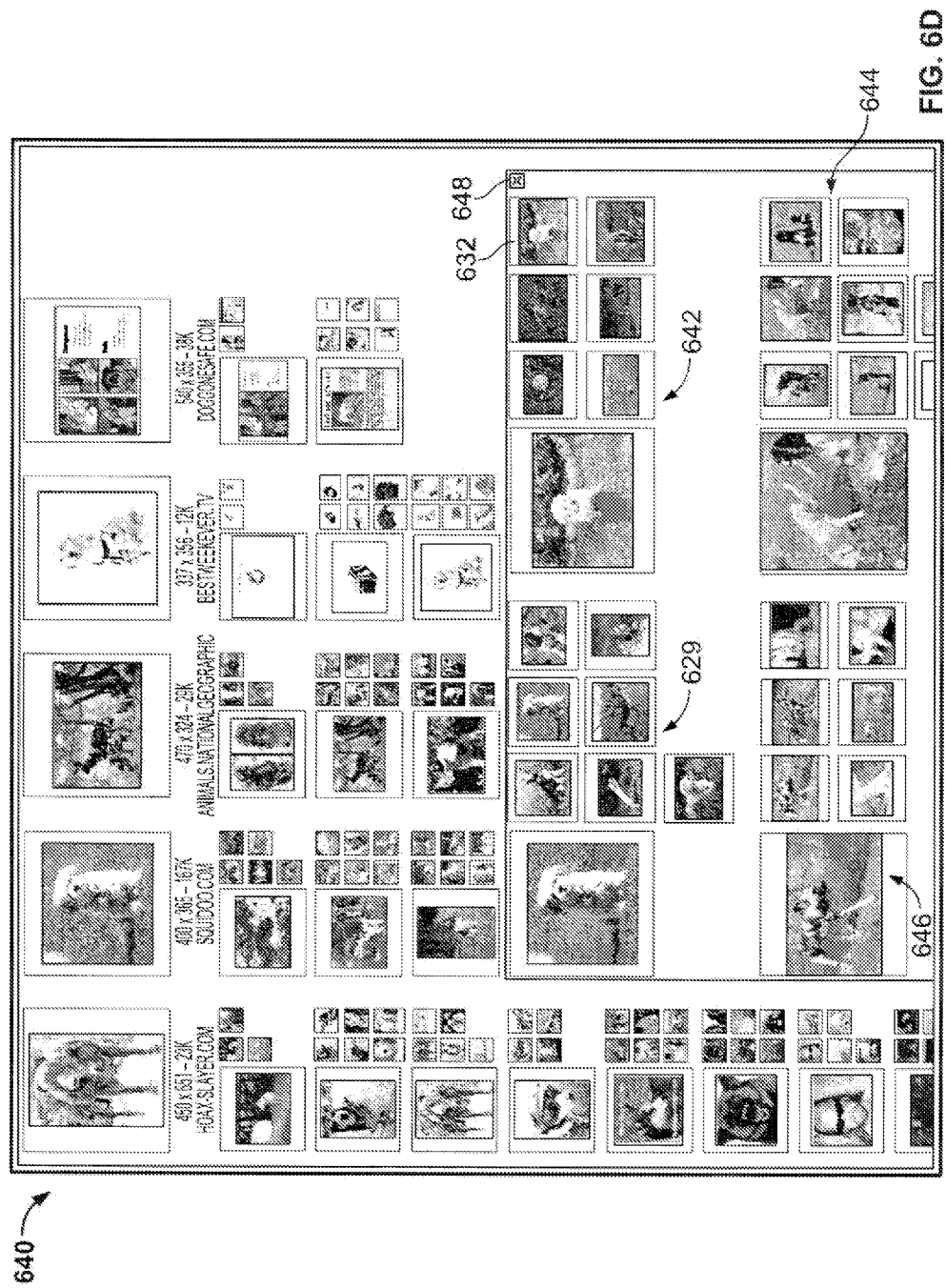

FIG. 6D is a graphical user interface 640 illustrating the view 632 in a fully expanded state. The view 632 includes a number of selectable images within image clusters 629, 642, 644, and 646. In some implementations, the user clicks outside of an expanded view 632 to close the expanded view 632 and continue reviewing image search results and/or explore other image clusters. In some implementations, the user selects a close button 648 to return to a previous view. Although, only canonical images, their children, grandchildren images, and great grandchildren images are depicted in FIG. 6D, more or fewer levels of granularity can be depicted.

The graphical user interface implementations in the foregoing description are generally presented in an interactive browser. The depicted FIGS. 4A-6D are example representations of graphical user interface implementations and are not intended to be limiting. Many variations of the layout and functionality of graphical user interfaces are possible. Accordingly, the scope of protection is not limited by the description set out above. Similarly, the foregoing description does not represent an exhaustive list of all possible implementations consistent with this disclosure or of all possible variations of the implementations described. Other implementations are within the scope of the following claims.

Figure 7A:
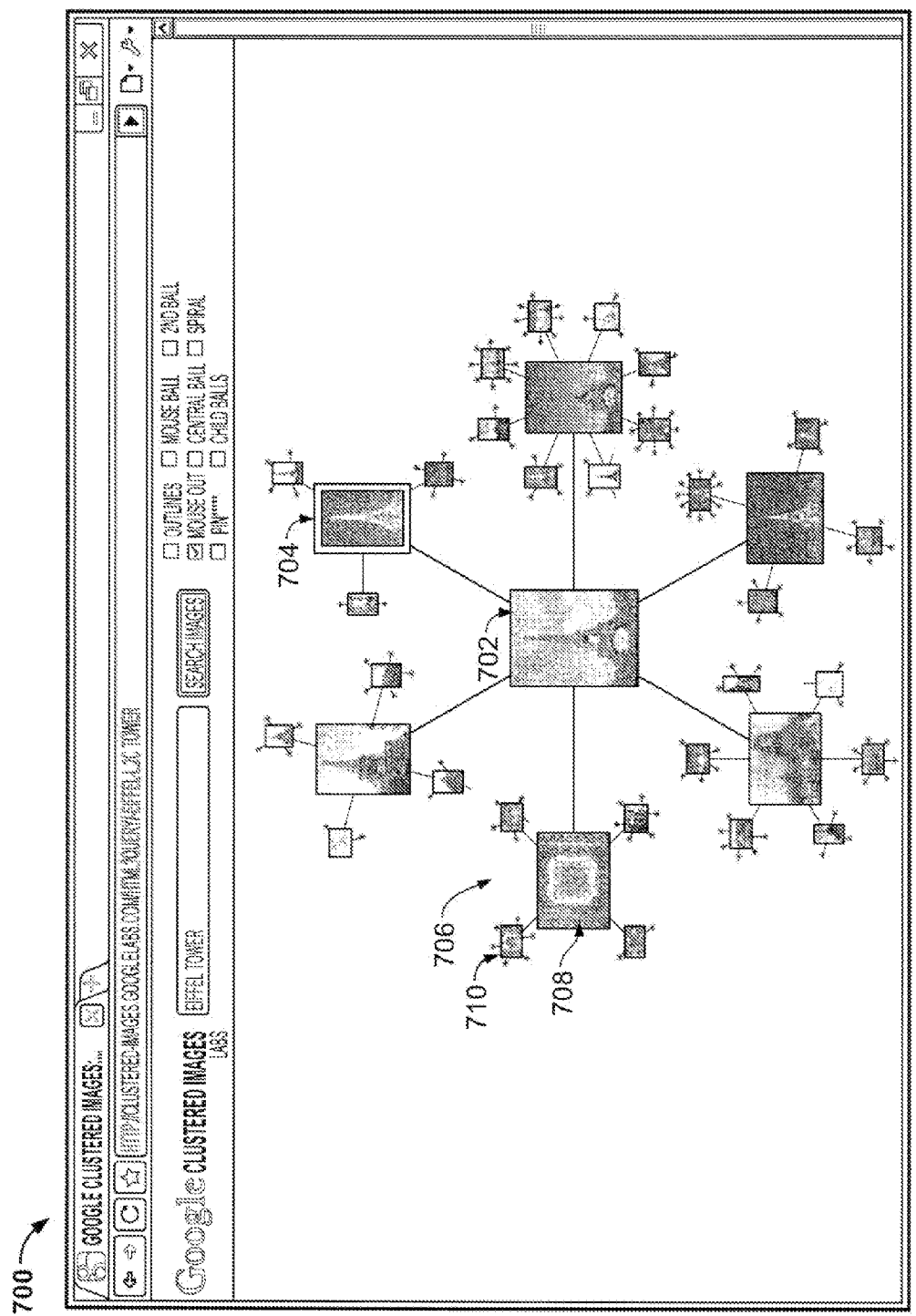
FIGS. 7A-7B represent example graphical user interfaces used for presenting hierarchical image search results.
Figure 7B:
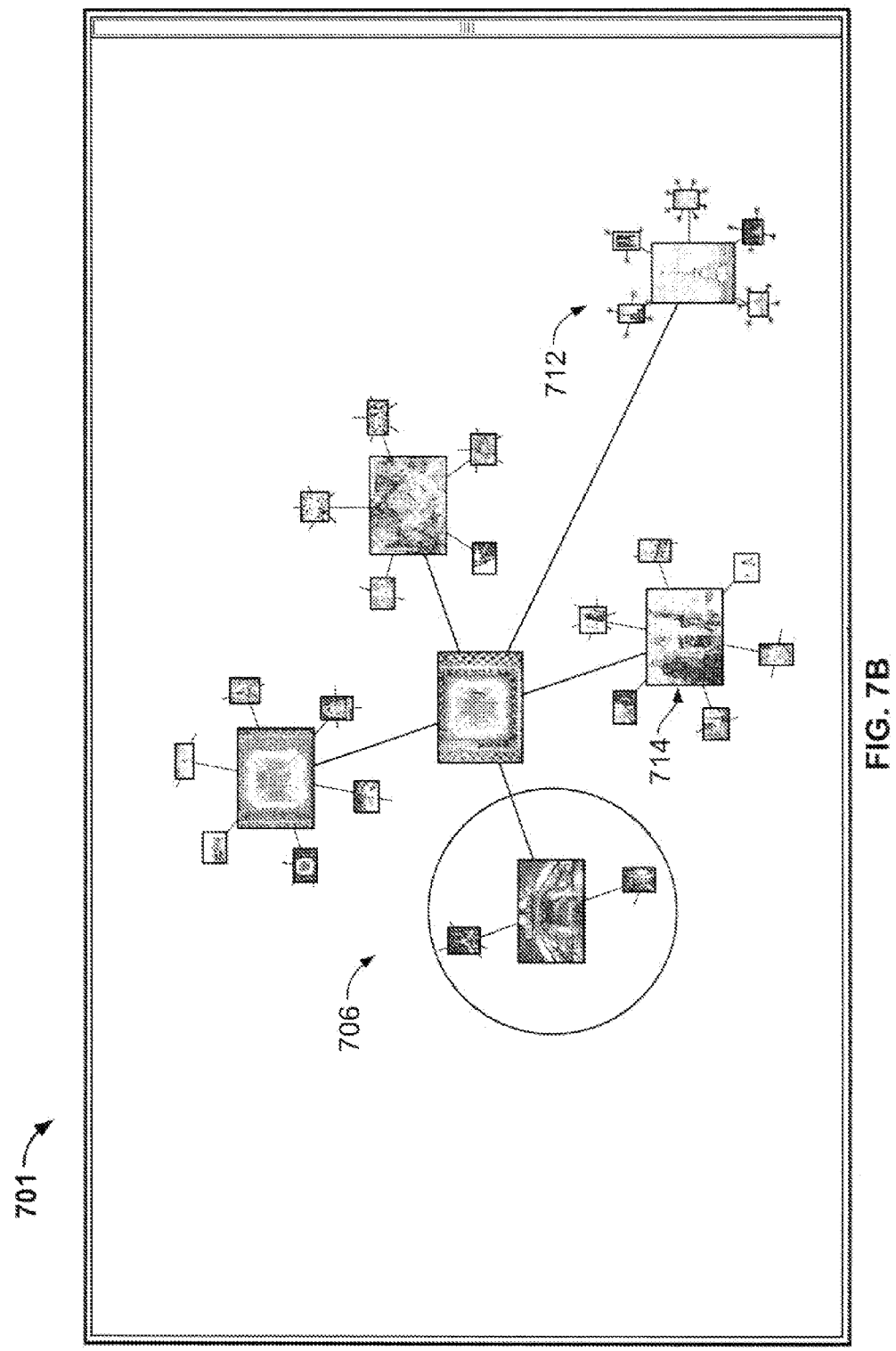

FIGS. 7A-7B represent example graphical user interfaces used for presenting hierarchical image search results. The graphical user interfaces shown in FIGS. 7A-7B enable a user to view a display of the image search results according to image clusters and canonical images for each cluster. The clusters can be generated and canonical images identified as described above with respect to FIGS. 1-3. In some implementations, the graphical user interfaces are zoomable user interfaces (ZUIs). Users can use the ZUI, for example, to pan across the virtual surface in two dimensions and zoom into images and/or objects of interest within the user interface. For example, if the user zooms into an image, it may be represented as a small dot, then a thumbnail of the image, then a full sized page of the image, and then a magnified view of the image.

FIG. 7A, shows a graphical user interface 700 that includes six top level (e.g., parent) image clusters, for example, image cluster 704. A center image 702 identifies a canonical image for the six top level image clusters (e.g., a canonical image identified from the six top level canonical images). The graphical user interface 700 can be generated by the system if, for example, the system receives image search results responsive to an image query for the phrase "Eiffel Tower." Although FIG. 7A depicts six top level image clusters, any number of image clusters can be displayed within the GUI 700. The image clusters shown as center images with spokes leading to other images (e.g., canonical images of lower level clusters). For example, image cluster 706 represented by canonical image 708 has four spokes radiating out to smaller images including image 710. Each of these images represents a canonical image of a lower level hierarchal clustering of images including one or more additional images.

FIG. 7B shows a graphical user interface 701 illustrating a zoom action performed on the user interface of FIG. 7A. The graphical user interface 701 can be generated by the system if, for example, the system receives a user input to the user interface of FIG. 7A selecting top level image cluster 706 (or canonical image 708 in particular). In particular, cluster 706 is shown enlarged relative to the remaining top level clusters and central image 712. Thus, the original top level clusters remain visible, but smaller. Spokes extend from the canonical image 708 of the top level cluster 706 to lower level clusters from which canonical image 708 was selected. Each of these lower level clusters includes a centered canonical image (e.g., image 714) and spokes to lower level images. In some implementations, the user continues to zoom into clusters that spoke off from a canonical image. Alternatively, the user can return to the top level clusters by selecting an image from the top level clusters. Additionally, the user can select the central canonical image 702 to return to the top level user interface shown in FIG. 7A.

Figure 8A:
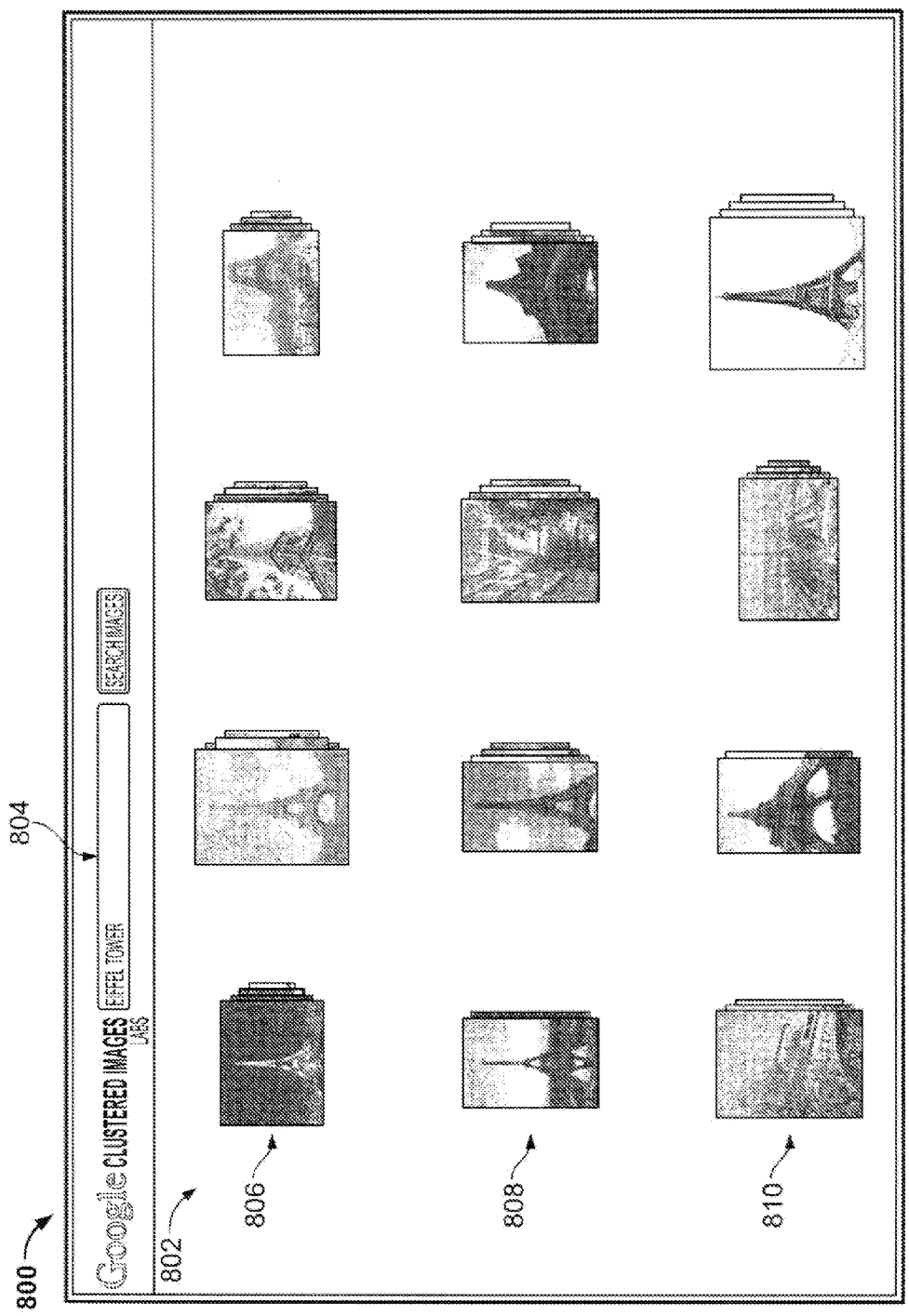
FIGS. 8A-8C represent example graphical user interfaces used for presenting hierarchical image search results.
Figure 8B:
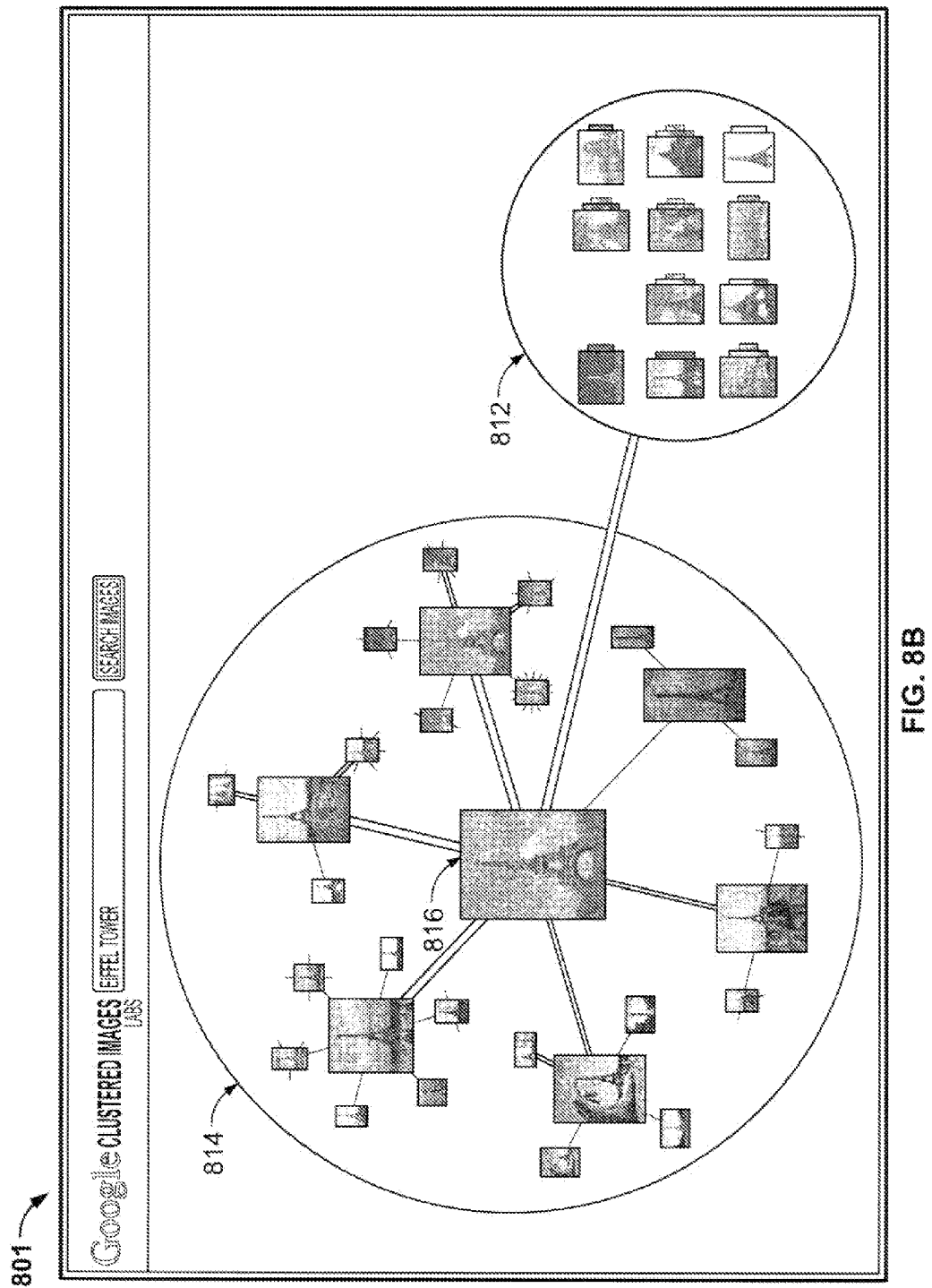
Figure 8C:
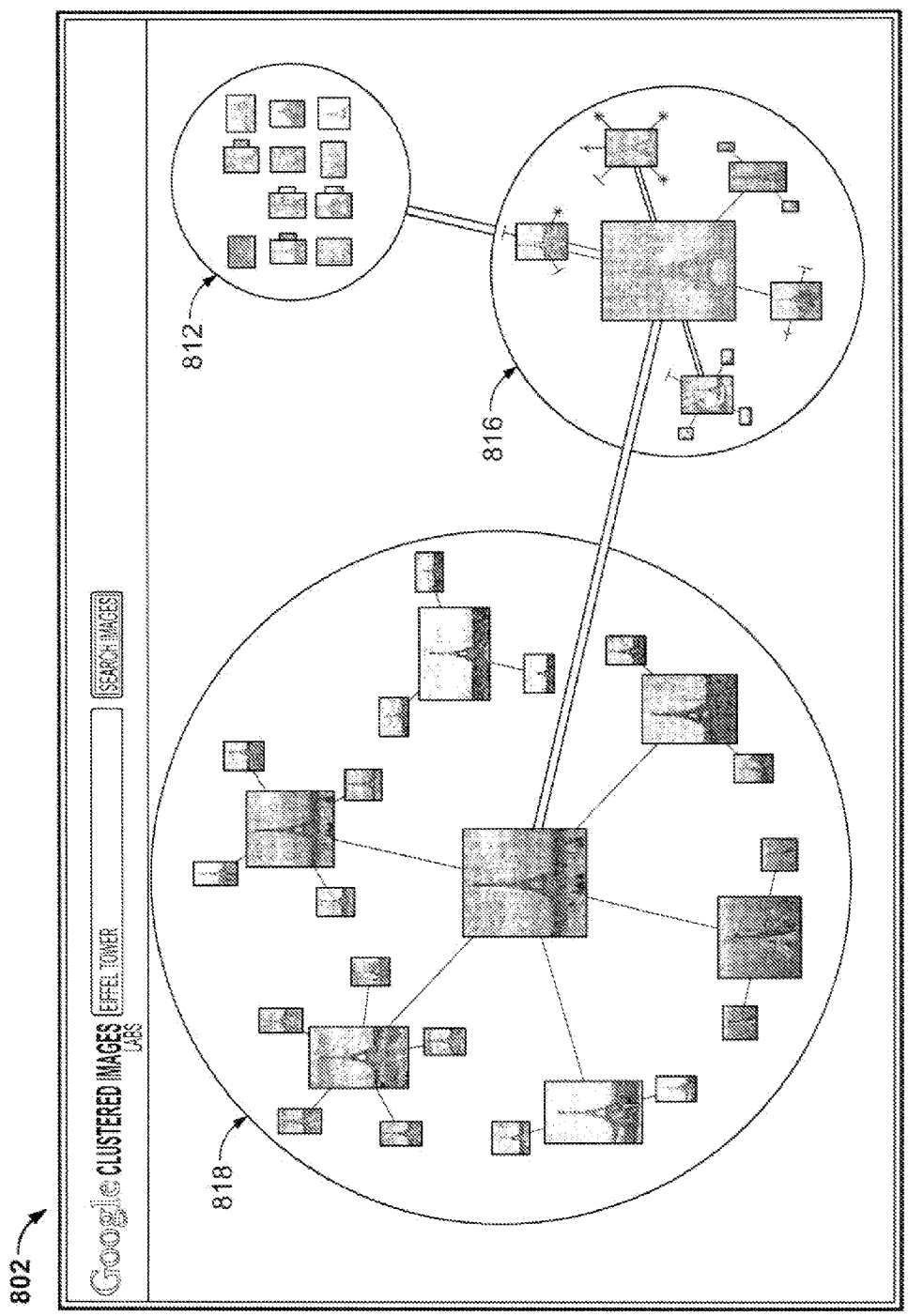

FIGS. 8A-8C represent example graphical user interfaces used for presenting hierarchical image search results.

FIG. 8A shows a graphical user interface 800 including an array of image clusters 802. The array of image clusters are generated in response to an image search query entered into a search field 804. In particular, the image search query "Eiffel tower". The array of image clusters 802 represent clusters of images responsive to the image search query. In contrast to the graphical user interfaces described above, the individual clusters in the array are not necessarily hierarchically related to one another.

The array of image clusters 802 are arranged in representative clusters where similar clusters, both semantically and visually, are placed near each other. In some implementations, a greedy algorithm is used to identify the clusters to present.

In particular, the array of image clusters 802 includes a first row of clusters 806, a second row of clusters 808 and a third row of clusters 810. The first row of clusters 806 represents the top four clusters sorted according to strength. The strength of a cluster is a function of cluster size and original rank. For example, as described above, image search results are clustered using, for example, a similarity matrix.

The image search results are clustered into a hierarchical grouping of clusters (e.g., using hierarchical agglomerative clustering). In some other implementations, one or more different clustering techniques are used including K-means, spectral clustering, and affinity propagation. Each cluster has a size indicating the number of images in the cluster and the images within the cluster have a ranking value associated with the received search results. This combination can be used to identify the top clusters.

In some implementations, the top four image clusters are based on the highest image rank received for top level canonical images of the hierarchy of image clusters. For example, if there are twelve top level canonical images, the four highest ranking ones are selected as the top row of the array. Canonical images representing clusters similar to those four can then be selected for the next rows as described below. In some other implementations, other ranking measures can be used to identify the top clusters, for example, image quality measures, ranks associated with source resources (e.g., web pages including the images), or other signals.

The second row of cluster 808 in the array of image clusters 802 includes clusters that are visually similar to the clusters in the first row of clusters 806 above them. Thus, in the array of image clusters 802, the fifth cluster (i.e., the first cluster in the second row of clusters 808) is most similar to the first cluster of the first row of images 806 as well as the second cluster in the second row of cluster 808. For example, the first cluster in the first row of clusters 806 includes a cluster of nighttime images of the Eiffel tower, the first cluster in the second row of clusters 808 includes visually similar images to both the first cluster and the next cluster in the second row of clusters 808.

Similar clusters can be identified using the similarity matrix based on the images in the respective clusters. In some other implementations, the similarity between two image clusters is determined using different techniques, for example, by measuring the distance between the clusters (e.g., L2 distance or smoothed graph distance).

The third row of clusters 810 similarly includes clusters visually similar to the clusters in the second row of clusters 808 above them as well as similar to adjacent clusters. The process can iteratively be repeated to generate a specified number of image clusters (e.g., 20 clusters). Alternative techniques for arranging the image clusters in the array of image clusters 802 include multidimensional scaling and local linear embedding.

Each of the clusters in the array of image clusters 802 is selectable by the user in order to explore the cluster. In some implementations one or more of the clusters in the array of image clusters 802 is labeled with a descriptor for images in the cluster. FIG. 8B shows a graphical user interface 801 presenting hierarchical image search results associated with a selected image cluster of the array of image clusters 802 of FIG. 8A. In particular, the graphical user interface 801 includes an array of image clusters 812. The array of image clusters 812 can correspond to the array of image clusters 802. However, as shown in FIG. 8B, the selected image cluster is no longer presented in the array of image clusters 812.

The selected image cluster is displayed in as a hierarchical grouping of image clusters 814 connected to the presented array of image clusters 812. The hierarchical grouping of image clusters 814 is similar to those described above and includes a canonical image 816 the cluster at the presented level of the hierarchical grouping of clusters as well as several spokes to canonical images represented different hierarchical levels.

As described above, each of the images in the hierarchical grouping of image clusters 814 can be selected in order display images associated with that hierarchical level. The user can interact with the presented images to navigate to another level of the hierarchy (e.g., by selecting a canonical representation of a child cluster from the presented parent cluster within the hierarchy).

FIG. 8C shows a graphical user interface 801 presenting hierarchical image search results associated with a selected image cluster of the array of image clusters 802 of FIG. 8A. Specifically, a chain of selected clusters are all displayed with a relative size that changes to reflect the current zoom level. In particular, the currently selected cluster is shown larger while each step back in the hierarchical cluster is shown smaller relative to each other.

Thus, in FIG. 8C, the array of image clusters 812 is shown connected to a hierarchical cluster of images 816 for the selected cluster from the array of image clusters 812 smaller than the hierarchical cluster of images 816. The hierarchical cluster of images 816 is in turn connected to a hierarchical cluster of images 818 representing a child cluster of the hierarchical cluster of images 816 selected by a user. Thus, each selection of an image shown in a hierarchical cluster of images generates a new graphical representation of that child cluster represented in the parent cluster by a canonical image.

Figure 9:
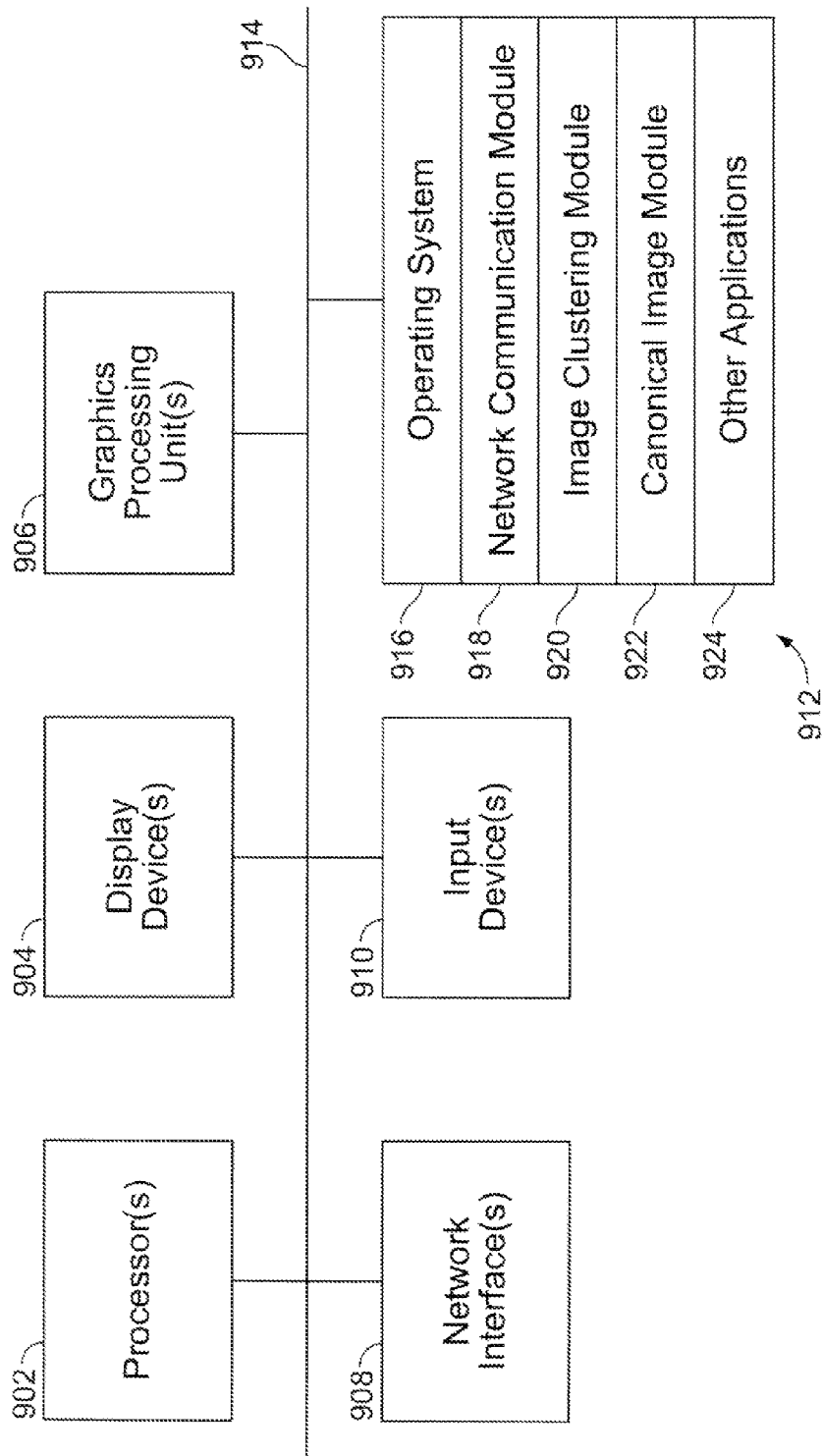
FIG. 9 is a schematic diagram of an example system for generating search results.

FIG. 9 illustrates an example architecture of a system 900. The system architecture 900 is capable of performing operations for grouping image search results. The system architecture 900 includes one or more processors 902 (e.g., IBM PowerPC, Intel Pentium 4, etc.), one or more display devices 904 (e.g., CRT, LCD), graphics processing units 906 (e.g., NVIDIA GeForce, etc.), a network interface 908 (e.g., Ethernet, FireWire, USB, etc.), input devices 910 (e.g., keyboard, mouse, etc.), and one or more computer-readable mediums 912. These components exchange communications and data using one or more buses 914 (e.g., EISA, PCI, PCI Express, etc.).

The term "computer-readable medium" refers to any medium that participates in providing instructions to a processor 902 for execution. The computer-readable medium 912 further includes an operating system 916 (e.g., Mac OS®, Windows®, Linux, etc.), a network communication module 918, image clustering module 920, canonical image module 922, and other applications 924.

The operating system 916 can be multi-user, multiprocessing, multitasking, multithreading, real-time and the like. The operating system 916 performs basic tasks, including but not limited to: recognizing input from input devices 910; sending output to display devices 904; keeping track of files and directories on computer-readable mediums 912 (e.g., memory or a storage device); controlling peripheral devices (e.g., disk drives, printers, etc.); and managing traffic on the one or more buses 914. The network communications module 918 includes various components for establishing and maintaining network connections (e.g., software for implementing communication protocols, such as TCP/IP, HTTP, Ethernet, etc.).

The image clustering module 920 provides various software components for performing the various functions for clustering image search results including generating a similarity matrix and clustering according to specified clustering criteria as described with respect to FIGS. 1-3. The canonical image module 922 provides various software components for performing the various functions for determining a canonical image for each cluster of images as described with respect to FIGS. 1-2.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, e.g., a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by one or more computers comprising one or more processors, the method comprising:
   receiving an image query;
   receiving ranked image search results responsive the image query;
   generating, by the one or more processors, a hierarchical grouping of the image search results based on measures of similarity between images identified by the image search results;
   identifying, by the one or more processors, a respective canonical image for each of a plurality of groups in the hierarchical grouping based on a likelihood that users will interact with the canonical image when presented with multiple images from the group; and
   providing, in response to the image query and by the one or more processors, data that present a visual representation of the identified canonical images wherein canonical images for lower levels of the hierarchy are presented smaller than canonical images for higher levels of the hierarchy.

2. The method of claim 1, further comprising:
   determining that user interaction with one of the identified canonical images; and
   in response to the determination, increasing a presentation size of images that are included in a same hierarchical grouping as the one of the canonical images.

3. The method of claim 2, further comprising:
   in response to the determination, decreasing a presentation size of images that are included in the same hierarchical grouping as the one of the canonical images.

4. The method of claim 2, wherein increasing in presentation size of images that are included in a same hierarchical grouping as the one of the canonical images comprises increasing a presentation size of child or grandchild images of the one of the canonical images more than an amount by which a presentation size of the one of the canonical images is increased.

5. The method of claim 2, further comprising presenting, in response to the determination, another hierarchical grouping of images that was not presented prior to the user interaction with the one of the identified canonical images.

6. The method of claim 1, wherein the measures of similarity between the images is based on one or more of content-based signals, user behavior-based signals, or text-based signals.

7. The method of claim 1, wherein the likelihood that users will interact with the canonical image is based on a number of local descriptors that the canonical image has in common with the multiple images from the group.

8. A system, comprising:
   data processing apparatus comprising a data storage device and one or more processors programmed to perform operations comprising:
   receiving an image query;
   receiving ranked image search results responsive the image query;
   generating a hierarchical grouping of the image search results based on measures of similarity between images identified by the image search results;
   identifying a respective canonical image for each of a plurality of groups in the hierarchical grouping based on a likelihood that users will interact with the canonical image when presented with multiple images from the group; and
   providing, in response to the image query, data that present a visual representation of the identified canonical images wherein canonical images for lower levels of the hierarchy are presented smaller than canonical images for higher levels of the hierarchy.

9. The system of claim 8, wherein the one or more processors are programmed to perform operations further comprising:

determining that user interaction with one of the identified canonical images; and in response to the determination, increasing a presentation size of images that are included in a same hierarchical grouping as the one of the canonical images.

10. The system of claim 9, wherein the one or more processors are programmed to perform operations further comprising:

in response to the determination, decreasing a presentation size of images that are included in the same hierarchical grouping as the one of the canonical images.

11. The system of claim 9, wherein increasing in presentation size of images that are included in a same hierarchical grouping as the one of the canonical images comprises increasing a presentation size of child or grandchild images of the one of the canonical images more than an amount by which a presentation size of the one of the canonical images is increased.

12. The system of claim 9, wherein the one or more processors are programmed to perform operations further comprising presenting, in response to the determination, another hierarchical grouping of images that was not presented prior to the user interaction with the one of the identified canonical images.

13. The system of claim 8, wherein the measures of similarity between the images is based on one or more of content-based signals, user behavior-based signals, or text-based signals.

14. The system of claim 8, wherein the likelihood that users will interact with the canonical image is based on a number of local descriptors that the canonical image has in common with the multiple images from the group.

15. A non-transitory computer readable storage medium storing instructions that, when executed by data processing apparatus, cause the data processing apparatus to perform operations comprising:

receiving an image query;

receiving ranked image search results responsive the image query;

generating a hierarchical grouping of the image search results based on measures of similarity between images identified by the image search results;

identifying a respective canonical image for each of a plurality of groups in the hierarchical grouping based on a likelihood that users will interact with the canonical image when presented with multiple images from the group; and providing, in response to the image query, data that present a visual representation of the identified canonical images wherein canonical images for lower levels of the hierarchy are presented smaller than canonical images for higher levels of the hierarchy.

16. The computer readable medium of claim 15, wherein the instructions cause the data processing apparatus to perform operations further comprising:

determining that user interaction with one of the identified canonical images; and in response to the determination, increasing a presentation size of images that are included in a same hierarchical grouping as the one of the canonical images.

17. The computer readable medium of claim 16, wherein the instructions cause the data processing apparatus to perform operations further comprising:

in response to the determination, decreasing a presentation size of images that are included in the same hierarchical grouping as the one of the canonical images.

18. The computer readable medium of claim 16, wherein increasing in presentation size of images that are included in a same hierarchical grouping as the one of the canonical images comprises increasing a presentation size of child or grandchild images of the one of the canonical images more than an amount by which a presentation size of the one of the canonical images is increased.

19. The computer readable medium of claim 16, wherein the instructions cause the data processing apparatus to perform operations further comprising presenting, in response to the determination, another hierarchical grouping of images that was not presented prior to the user interaction with the one of the identified canonical images.

20. The computer readable medium of claim 15, wherein the measures of similarity between the images is based on one or more of content-based signals, user behavior-based signals, or text-based signals.

\* \* \* \* \*